(12) United States Patent
Jo et al.

(10) Patent No.: US 11,931,830 B2
(45) Date of Patent: Mar. 19, 2024

(54) GAS SHIELDED ARC WELDING CONTROL METHOD AND CONTROL DEVICE

(71) Applicant: Kobe Steel, Ltd., Kobe (JP)

(72) Inventors: Baini Jo, Kanagawa (JP); Shogo Nakatsukasa, Kanagawa (JP); Akira Ogawa, Kanagawa (JP); Eiji Sato, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 620 days.

(21) Appl. No.: 16/981,005

(22) PCT Filed: Mar. 8, 2019

(86) PCT No.: PCT/JP2019/009356
§ 371 (c)(1),
(2) Date: Sep. 15, 2020

(87) PCT Pub. No.: WO2019/188124
PCT Pub. Date: Oct. 3, 2019

(65) Prior Publication Data
US 2021/0107081 A1    Apr. 15, 2021

(30) Foreign Application Priority Data
Mar. 28, 2018    (JP) ................. 2018-062123

(51) Int. Cl.
*B23K 9/095*    (2006.01)
*B23K 9/073*    (2006.01)
(Continued)

(52) U.S. Cl.
CPC ............. *B23K 9/095* (2013.01); *B23K 9/073* (2013.01); *B23K 9/12* (2013.01); *B23K 9/16* (2013.01)

(58) Field of Classification Search
CPC . B23K 9/092; B23K 9/12; B23K 9/09; B23K 9/124; B23K 9/173; B23K 9/095;
(Continued)

(56) References Cited

U.S. PATENT DOCUMENTS 6,008,470 A * 12/1999 Zhang .................... B23K 9/092
219/130.51
9,073,140 B2 * 7/2015 Hearn ...................... B23K 9/16
(Continued)

FOREIGN PATENT DOCUMENTS

CN    106132614 A  * 11/2016  ......... B23K 35/0255
JP    2008-246524 A    10/2008
(Continued)

OTHER PUBLICATIONS

Bell David, Avoiding mix-ups with shielding gas mixes, 2011, The Welder (Year: 2011).*
(Continued)

*Primary Examiner* — Sang Y Paik
*Assistant Examiner* — Damon Joel David Alfaro
(74) *Attorney, Agent, or Firm* — Oblon, McClelland, Maier & Neustadt, L.L.P.

(57) ABSTRACT

A control method for gas-shielded arc welding includes providing a normal arc period in which the welding current is maintained at a setting current Icc set in advance, and providing a separation control period after the separation timing of the molten droplet is detected in the normal arc period, the separation control period including a current decreasing section, a current maintaining section, and a current increasing section. In the separation control period, at least one of the following controls for preventing a short circuit is performed: control of an output voltage, control of a feeding speed, and control of a gas ratio.

19 Claims, 7 Drawing Sheets

(51) Int. Cl.
*B23K 9/12* (2006.01)
*B23K 9/16* (2006.01)

(58) Field of Classification Search
CPC .... B23K 9/0953; B23K 9/073; B23K 9/0732; B23K 9/0956; B23K 9/125; B23K 9/16
See application file for complete search history.

(56) References Cited

U.S. PATENT DOCUMENTS

| | | | |
|---|---|---|---|
| 10,786,862 B2 * | 9/2020 | Fujiwara | B23K 9/073 |
| 2008/0237196 A1 * | 10/2008 | Yamazaki | B23K 9/173 219/74 |
| 2009/0242533 A1 | 10/2009 | Yamazaki et al. | |
| 2018/0345399 A1 * | 12/2018 | Fujiwara | B23K 9/12 |
| 2021/0331264 A1 | 10/2021 | Fujiwara | |

FOREIGN PATENT DOCUMENTS

| | | | | |
|---|---|---|---|---|
| JP | 2009-233728 A | 10/2009 | | |
| JP | 2010052016 A * | 3/2010 | | B23K 9/201 |
| JP | 2011-88209 A | 5/2011 | | |
| JP | 2014-73521 A | 4/2014 | | |
| WO | WO-2016163073 A1 * | 10/2016 | | B23K 9/073 |
| WO | WO-2017029783 A1 * | 2/2017 | | B23K 9/073 |
| WO | WO 2017/135080 A1 | 8/2017 | | |

OTHER PUBLICATIONS

International Search Report and Written Opinion dated May 28, 2019 in PCT/JP2019/009356 (with English Translation).
Extended European Search Report dated Feb. 15, 2022 in European Patent Application No. 19774592.0.
Killing R: "About the Cause of the Bursting of Droplets During Metal-Active Gas Welding of Mild and Low-Alloy Steels", Welding and Cutting, DVS, vol. 2, No. 6, Jan. 1, 2003 (Jan. 1, 2003), pp. 313-315.
Yu-Ichi Ikegami et al: "Shielding gases for improved GMAW and GTAW processes", Welding International, Taylor & Francis, Abingdon, GB vol. 26, No. 3, Mar. 1, 2012 (Mar. 1, 2012), pp. 187-195.

* cited by examiner

GAS SHIELDED ARC WELDING CONTROL METHOD AND CONTROL DEVICE

TECHNICAL FIELD

The present invention relates to a control method and a control apparatus for gas-shielded arc welding capable of preventing a generation of spatter generated immediately after separation of a molten droplet in consumable electrode-type gas-shielded arc welding using a shielding gas containing $CO_2$ in a predetermined amount or more.

BACKGROUND ART

Typically, globule transfer, which is one of the transfer forms of a molten droplet (or also referred to as a "molten part"), is a phenomenon in which the molten droplet having a size larger than a diameter (wire diameter) of the welding wire is transferred to a molten pool. In the case where gas-shielded arc welding is performed under a middle to high current condition (250 A or more in the case where a wire diameter of 1.2 φ is used, for example) in an atmosphere of carbon dioxide gas having $CO_2$ content of 100% by volume or of mixed gas having $CO_2$ content of 30% by volume or more with the balance being Ar, an arc reaction force concentrates immediately below a molten droplet due to a pinch of the arc, and a repulsive force to push up the molten droplet increases.

Also, the molten droplet pushed up by the arc reaction force cannot easily be separated, and the molten droplet grows to be larger than the wire diameter and is then separated due to its own weight. The separated molten droplet is transferred to the molten pool while showing irregular and unstable behaviors, and large particle spatter may be generated, or the separated molten droplet itself may become spatter. Furthermore, there is also a case in which when the arc moves to a welding wire (also simply referred to as a "wire" or a "consumable electrode") after the molten droplet is separated, the melt remaining at the wire tip is blown off, resulting in generation of small particle spatter.

Considering such circumstances, various proposals as described below have been made as methods for preventing generation of the spatter as described above.

For example, Patent Literature 1 proposes a technique capable of reducing generation of spatter as compared with a DC carbon dioxide gas arc welding method, by providing a peak period and a base period in a carbon dioxide gas-shielded arc welding method, oscillating a peak current in the peak period, forming a molten droplet into a desired size, and causing a short circuit of the formed molten droplet in the base period.

However, there is a concern that minute spatter is generated during the oscillation of the molten droplet in the peak period in which the molten droplet is oscillated according to Patent Literature 1. In addition, since the molten droplet that has been made to grow to the desired size is migrated by a short circuit in the base period, spatter may be generated when the short circuit is released.

Further, Patent Literature 2 discloses a method of pushing up a short circuit and an excessively increased molten droplet on the basis of pulse waveform control, forming migration of the molten droplet while preventing deformation of the molten droplet, then forming a constriction at an upper portion of the molten droplet using a pulse peak current, and separating the molten droplet in a pulse base period in which the current is low. In addition, a method of regularly migrating a molten droplet with a constant size by outputting an optimal pulse current at each timing of molten droplet formation and molten droplet separation using the aforementioned method has been proposed.

However, according to the method in Patent Literature 2, since the molten droplet is actively formed in order to maintain regularity of migration of the molten droplet, and a base modulation waveform control scheme is used as the current pulse for separating the molten droplet, it is difficult to control the arc length in the pulse peak period, and a spatter reduction effect is not sufficient. Further, although Patent Literature 2 describes that a somewhat spatter reduction effect is achieved, there is also a problem that restrictions related to welding conditions, welding postures, and the like are provided.

CITATION LIST

Patent Literature

Patent Literature 1: JP-A-2011-88209
Patent Literature 2: JP-A-2009-233728

SUMMARY OF INVENTION

Technical Problem

Although various techniques for stabilizing formation and separation states of a molten droplet and preventing scattered spatter in separation of the molten droplet in a carbon dioxide gas-shielded arc welding method as described above, preventing spatter immediately after the separation of the molten droplet while the arc length is maintained substantially constant has not been considered. More specifically, it has not been considered to perform welding while preventing generation of large particulate spatter in separation of the molten droplet without causing a short circuit between the molten droplet and a molten pool in the carbon dioxide gas-shielded arc welding method under a middle to high current condition.

The present invention was made by focusing on such circumstances, and an object thereof is to provide a control method for gas-shielded arc welding capable of achieving an excellent bead appearance while preventing generation of spatter when a molten droplet is separated, without causing a short circuit between the molten droplet and a molten pool, in the case of performing a consumable electrode-type gas-shielded arc welding using a shielding gas containing $CO_2$ in a predetermined amount or more.

Solution to Problem

A control method for gas-shielded arc welding of the present invention to solve the above problem is a control method for gas-shielded arc welding in which a welding current is controlled using, as a shielding gas, carbon dioxide gas having a $CO_2$ content of 100% by volume or a mixed gas having a $CO_2$ content of 30% by volume or more with the balance being Ar, by detecting a separation timing of a molten droplet at a welding wire tip melted by an arc, the method including:

providing a normal arc period in which the welding current is maintained at a setting current Icc set in advance; and providing a separation control period after the separation timing of the molten droplet is detected in the normal arc period, the separation control period including a current decreasing section in which the welding current is decreased, a current maintaining section in which the welding current is maintained at a constant separation maintaining current Ih1 after the current decreasing section, and a current increasing section in which the welding current is increased after the current maintaining section, in which in the separation control period, at least one of the following controls (a) to (c) for preventing a short circuit is performed:
(a) control of an output voltage by maintaining the arc voltage during welding within ±10% with respect to a setting voltage;
(b) control of a feeding speed by decelerating a wire feeding speed Fs during welding to a range of 40% to 95% with respect to a setting wire feeding speed; and
(c) control of a gas ratio by increasing an Ar ratio in the shielding gas to a range of 50% to 100% by volume.

In a preferable embodiment of the control method for gas-shielded arc welding of the present invention, in a case of performing the control (a), the arc voltage is maintained within ±5% with respect to the setting voltage, in a case of performing the control (b), the wire feeding speed Fs is decelerated to a range of 50% to 95% with respect to the setting wire feeding speed, and in a case of performing the control (c), the Ar ratio in the shielding gas is increased to a range of 80% to 100% by volume.

In a preferable embodiment of the control method for gas-shielded arc welding of the present invention, a slope of the welding current in the current decreasing section, the slope being an amount of change in the welding current per unit time, is −200 A/ms to −50 A/ms, in which a separation maintaining time Th1 of the welding current in the current maintaining section is 2 ms to 8 ms, in which a slope of the welding current in the current increasing section is 50 A/ms to 300 A/ms, in which the separation maintaining time Th1 [ms], a wire diameter d [mm], and the wire feeding speed Fs [m/min] in the current maintaining section satisfy the following relationship (1):

$$0.4 \leq (1.2/d) \times (Fs/15) \times Th1 \leq 10 \quad (1).$$

In a preferable embodiment of the control method for gas-shielded arc welding of the present invention, the separation maintaining current Ih1 [A] and the wire feeding speed Fs [m/min] in the current maintaining section satisfy the following relationship (2):

$$50 \leq (15/Fs) \times Ih1 \leq 280 \quad (2).$$

In a preferable embodiment of the control method for gas-shielded arc welding of the present invention, the method further includes providing a forced separation control period for forcibly promoting separation of a molten droplet in a case where a separation cycle of the molten droplet, which is defined as a total period of the separation control period and the normal arc period, exceeds a monitoring time Tarc set in advance, in which the monitoring time Tarc is 10 ms to 60 ms, in which the monitoring time Tarc [ms], the setting current Icc [A], and a wire diameter d [mm] of the welding wire satisfy the following relationship (3):

$$10 \leq (d/1.2) \times (350/Icc) \times Tarc \leq 80 \quad (3).$$

In a preferable embodiment of the control method for gas-shielded arc welding of the present invention, the forced separation control period includes a forced current decreasing section in which the welding current is decreased, a forced current maintaining section in which the welding current is maintained at a constant forced separation maintaining current Ih2 after the forced current decreasing section, and a forced current increasing section in which the welding current is increased after the forced current maintaining section, in which a slope of the welding current in the forced current decreasing section is −100 A/ms or less, in which a forced separation maintaining time Th2 of the welding current in the forced current maintaining section is 1 ms to 5 ms, in which a slope of the welding current in the forced current increasing section is 10 A/ms to 300 A/ms, in which the method further includes providing a forced separation arc period in which the welding current after the forced separation control period is maintained under a condition of a forced arc maintaining current Ih3 being 1.20 to 2.50 times the setting current Icc and a forced arc maintaining time Th3 of 3 ms to 10 ms.

In a preferable embodiment of the control method for gas-shielded arc welding of the present invention, in a case where a separation timing of the molten droplet is detected in the forced separation control period, the control moves on to the current decreasing section in the separation control period.

In a preferable embodiment of the control method for gas-shielded arc welding of the present invention, in a case where a separation timing of the molten droplet is detected in the forced separation arc period, the control moves on to the current decreasing section in the separation control period.

In a preferable embodiment of the control method for gas-shielded arc welding of the present invention, a separation timing of the molten droplet in the forced separation control period or the forced separation arc period is detected using the arc voltage.

In a preferable embodiment of the control method for gas-shielded arc welding of the present invention, the separation timing of the molten droplet in the normal arc period is detected using an arc resistance.

A control apparatus for gas-shielded arc welding of the present invention to solve the above problem is a control apparatus for gas-shielded arc welding in which a welding current is controlled using, as a shielding gas, carbon dioxide gas having $CO_2$ content of 100% by volume or a mixed gas having $CO_2$ content of 30% by volume or more with the balance being Ar, by detecting a separation timing of a molten droplet at a welding wire tip melted by an arc, the control apparatus configured to perform:

providing a normal arc period in which the welding current is maintained at a setting current Icc set in advance; and providing a separation control period after the separation timing of the molten droplet is detected in the normal arc period, the separation control period including a current decreasing section in which the welding current is decreased, a current maintaining section in which the welding current is maintained at a constant separation maintaining current Ih1 after the current decreasing section, and a current increasing section in which the welding current is increased after the current maintaining section;

in which in the separation control period, at least one of the following controls (a) to (c) for preventing a short circuit is performed:
(a) control of an output voltage by maintaining the arc voltage during welding within ±10% with respect to the setting voltage;
(b) control of a feeding speed by decelerating a wire feeding speed Fs during welding to a range of 40% to 95% with respect to a setting wire feeding speed; and (c) control of a gas ratio by increasing an Ar ratio in the shielding gas to a range of 50% to 100% by volume.

Advantageous Effects of Invention

In the control method for gas-shielded arc welding of the present invention, it is possible to achieve an excellent bead appearance while preventing generation of spatter at the time of a molten droplet is separated, without causing a short circuit between the molten droplet and a molten pool, in the case of performing consumable electrode-type gas-shielded arc welding using a shielding gas containing $CO_2$ in a predetermined amount or more.

DESCRIPTION OF EMBODIMENTS

Hereinafter, embodiments for carrying out a control method for gas-shielded arc welding in the present invention (embodiments) will be described. The present invention is not limited to the embodiments described below. Also, "to" in the specification means equal to or greater than the lower limit value and equal to or less than the upper limit value.

First, an overall flow of the control method for gas-shielded arc welding according to the embodiments of the present invention will be described using a flowchart.

Figure 1:
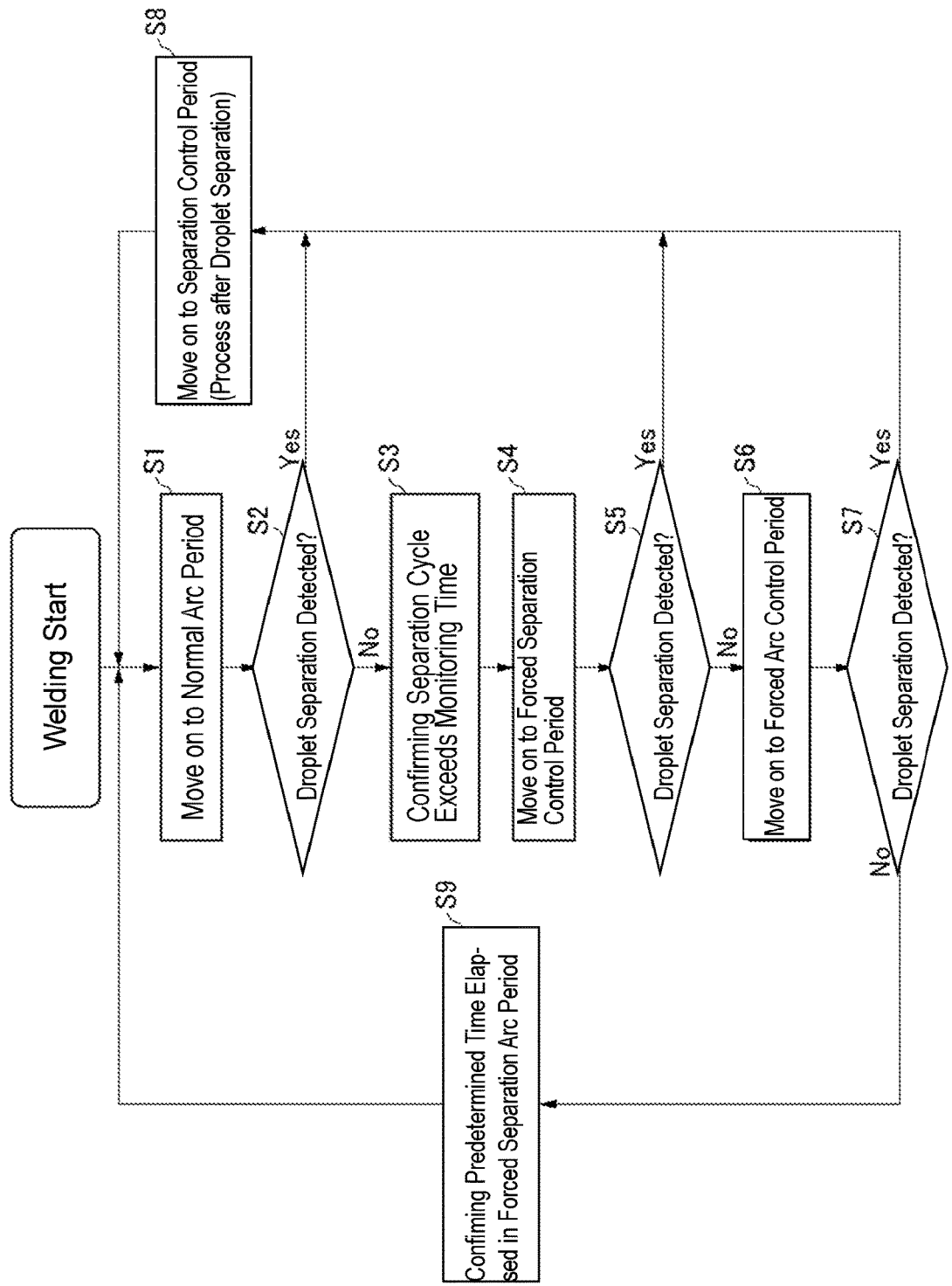
FIG. 1 is a flowchart for illustrating a control method for gas-shielded arc welding according to an embodiment of the present invention.

As illustrated in FIG. 1, the process proceeds to a normal arc period in which a welding current is maintained at a setting current Icc set in advance, after welding is started (Step S1).

Whether a separation timing of the molten droplet can be detected is always determined in the normal arc period (Step S2), and in the case where the separation timing of the molten droplet can be detected (Yes in Step S2), the processing proceeds to a separation control period, which will be described later (Step S8). After the separation control period ends, the processing returns to the normal arc period again (Step S1).

On the other hand, in the case where the separation timing of the molten droplet cannot be detected (No in Step S2), it is confirmed that a separation cycle (see details below) of the molten droplet has elapsed to exceed a monitoring time (Step S3), and then the processing proceeds to a forced separation control period (Step S4).

Whether the separation timing of the molten droplet can be detected is always determined even in the forced separation control period (Step S5), and in the case where the separation timing of the molten droplet can be detected (Yes in Step S5), the processing proceeds to the separation control period (Step S8). After the separation control period ends, the processing returns to the normal arc period again (Step S1).

On the other hand, in the case where the separation timing of the molten droplet cannot be detected (No in Step S5), the processing proceeds to the forced separation arc period (Step S6) after the forced separation control period ends.

Whether the separation timing of the molten droplet can be detected is always determined even in the forced separation arc period (Step S7), and in the case where the separation timing of the molten droplet can be detected (Yes in Step S7), the processing proceeds to the separation control period (Step S8). After the separation control period ends, the processing returns to the normal arc period again (Step S1).

On the other hand, in the case where the separation timing of the molten droplet cannot be detected (No in Step S7), it is confirmed that the forced separation arc period has elapsed to exceed a predetermined time (Step S9), and the processing returns to the normal arc period again (Step S1).

As described in the aforementioned flow, in the control method for gas-shielded arc welding according to the embodiments, the processing immediately proceeds to the separation control period in the case where the separation detection of the molten droplet is done in any one of the normal arc period, the forced separation control period, and the forced separation arc period. Then, predetermined short-circuit prevention control as described later is performed in the separation control period.

Next, details of the control method for gas-shielded arc welding according to the embodiments will be described separately in a first embodiment, a second embodiment, and a third embodiment. The first embodiment is an example of the case where the separation detection of the molten droplet has been done in the normal arc period (Yes in Step S2). The second embodiment is an example of the case where the separation detection of the molten droplet has been done in the forced separation arc period (Yes in Step S7). The third embodiment is an example of the case where the separation detection of the molten droplet has been done in the forced separation control period (Yes in Step S5).

First Embodiment

First, a control method for gas-shielded arc welding according to the first embodiment will be described. As described above, the first embodiment is an example of the case where the separation detection of the molten droplet has been done in the normal arc period (Yes in Step S2).

Figure 2:
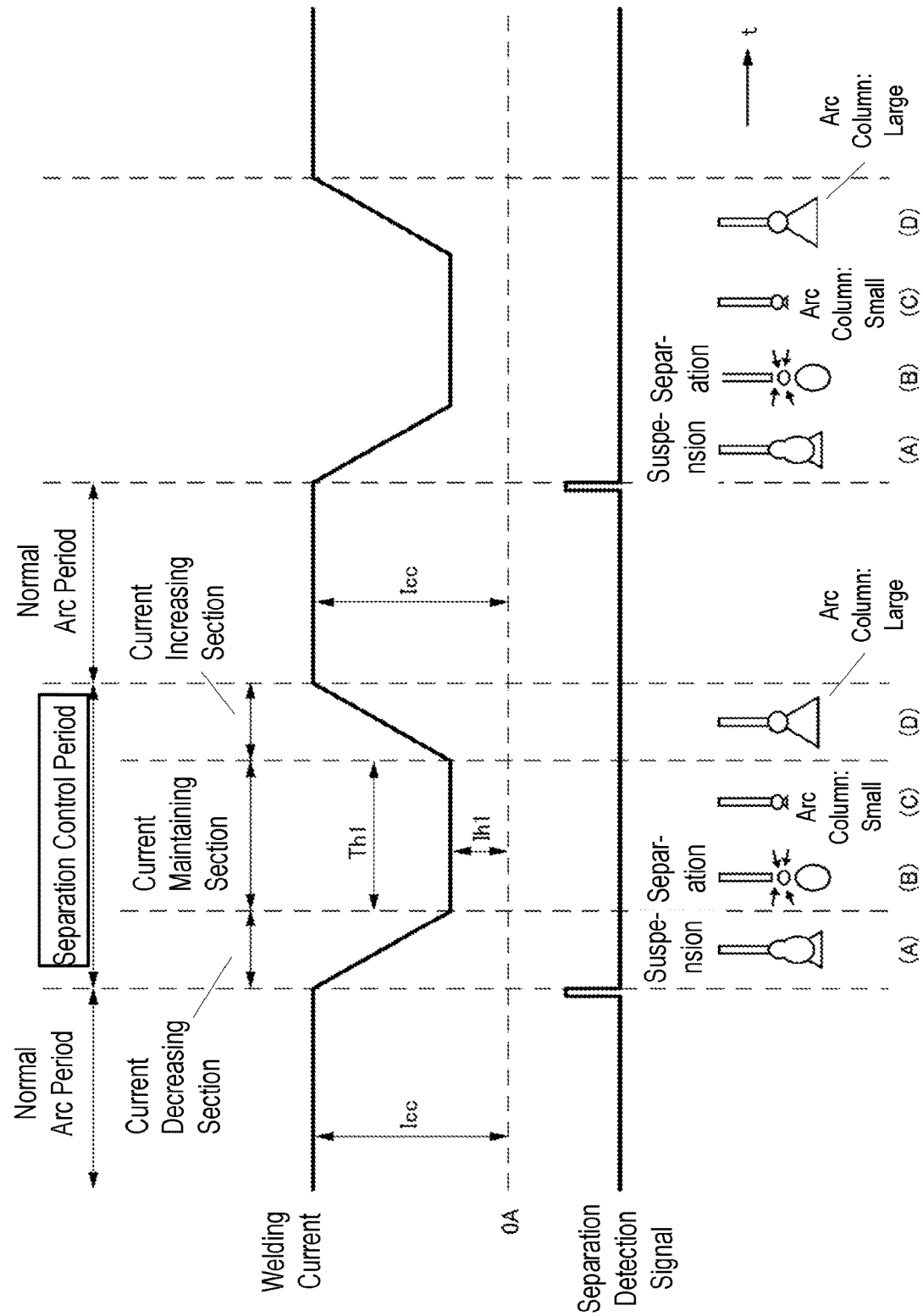
FIG. 2 is a schematic diagram for illustrating a waveform diagram of a welding current and a waveform diagram of a separation detection signal with respect to a time axis (t), and states of a molten droplet at predetermined timings in the waveform diagram, in a control method for gas-shielded arc welding according to a first embodiment of the present invention.

FIG. 2 is a schematic diagram for illustrating a waveform diagram of a welding current and a waveform diagram of a separation detection signal with respect to a time axis (t) and states of a molten droplet at predetermined timings in the waveform diagrams, in the control method for gas-shielded arc welding according to the first embodiment of the present invention. Hereinafter, detailed description will be given with reference to the drawing.

In the control method for gas-shielded arc welding according to the first embodiment, a separation cycle of the molten droplet includes two periods, namely the normal arc period and the separation control period. Also, welding is performed by repeating the separation cycle of the molten droplet.

[Normal Arc Period]

In the normal arc period, a setting current Icc set in advance is applied in order to form a molten droplet at a welding wire tip and causes the molten droplet to migrate. This control method is suitable for a range of a middle current to a high current. As the most effective range for control, the value of the setting current Icc is 250 to 500 A. A more preferable upper limit is 380 A, and a more preferable lower limit is 280 A.

Further, the separation timing of the molten droplet formed at the welding wire tip is detected in the normal arc period. At this time, a separation detection signal that is a signal output in the case where separation of the molten droplet or a timing immediately before the separation is detected (hereinafter, collectively referred to as "separation detection of the molten droplet") is used in order to examine the separation timing of the molten droplet.

One example thereof will be specifically described. When the molten droplet is separated, a root of the molten droplet that is present at the wire tip constricts, and as a result of the constriction advancing, an arc voltage and an arc resistance (=arc voltage/welding current) increase. Also, since the arc length is extended due to the separation of the molten droplet, the arc voltage and the arc resistance increase. Of course, time differential values and time second-order differential values thereof also increase. The arc voltage, the arc resistance, and further, the time differential values and the time second-order differential values thereof constantly increase from when the molten droplet starts to constrict until when the molten droplet is separated. Therefore, it is possible to determine the separation timing of the molten droplet by detecting at least any one of these, performing a predetermined arithmetic operation, comparing the result with a predetermined threshold value, and outputting the result as a separation detection signal.

More specifically, it is possible to refer to the molten droplet separation detecting method disclosed in JP-A-2008-246524, for example.

[Separation Control Period]

In the case where the separation detection of the molten droplet has been done in the aforementioned normal arc period, switching to a welding current lower than the welding current (that is, the setting current Icc) at the time of the detection is immediately performed, and the processing proceeds to the separation control period. The separation control period includes three sections, namely a current decreasing section in which the welding current is decreased under predetermined conditions, a current maintaining section in which the welding current is maintained at a constant separation maintaining current Ih1 for a predetermined separation maintaining time Th1 after the current decreasing section, and a current increasing section in which the welding current is increased under predetermined conditions after the current maintaining section.

(Current Decreasing Section)

The current decreasing section is provided in order to reduce scattered spatter using an arc reaction force in the normal arc period. More specifically, oscillation of the molten droplet is prevented such that the molten droplet can stably be separated in the current maintaining period, which will be described later, by reducing the arc reaction force by providing the current decreasing section immediately after the separation detection of the molten droplet.

The slope of the welding current, which is the amount of change in welding current per unit time, in the current decreasing section is preferably −200 A/ms to −50 A/ms. In the case where the aforementioned slope of the welding current exceeds −50 A/ms, the molten droplet is separated in the current decreasing section immediately after the molten droplet separation, and spatter is generated due to an arc reaction force, which is unfavorable. The aforementioned slope of the welding current is preferably −120 A/ms or less, more preferably −100 A/ms or less.

On the other hand, in the case where the aforementioned slope of the welding current is less than −200 A/ms, there is a concern that the wire is short-circuited with the molten pool, which is unfavorable. The aforementioned slope of the welding current is preferably −180 A/ms or more, more preferably −150 A/ms or more.

In the current decreasing section, a suspended state in which the constriction of the molten droplet has been promoted has been achieved as illustrated in the schematic diagram of the states of the molten droplet in FIG. 2 (see (A) in the drawing).

(Current Maintaining Section)

The current maintaining section is provided to secure a time required for the molten droplet to fully drop in the molten pool in order to prevent transformation of the separated molten droplet into spatter. The separation maintaining time Th1 of the welding current in the current maintaining section is preferably 2 ms to 8 ms. In the case where the separation maintaining time Th1 exceeds 8 ms, there is a concern that the wire and the molten pool are short-circuited and this leads to generation of spatter, which is unfavorable. The separation maintaining time Th1 is preferably 5 ms or less.

On the other hand, in the case where the separation maintaining time Th1 is less than 2 ms, the processing proceeds to the current increasing section, which will be described later, without the molten droplet migrating to the molten pool, the strengthened arc reaction force causes explosion of the molten droplet, and spatter is likely to be generated, which is unfavorable. The separation maintaining time Th1 is preferably 3 ms or more.

Also, the separation maintaining time Th1 [ms], the wire diameter d [mm], and the wire feeding speed Fs [m/min] in the current maintaining section preferably satisfy the following relationship (1).

$$0.4 \leq (1.2/d) \times (Fs/15) \times Th1 \leq 10 \qquad (1)$$

If the relationship of the separation maintaining time Th1, the wire diameter d, and the wire feeding speed Fs falls within the aforementioned numerical range, it becomes possible to perform stable separation control of the molten droplet, and as a result, this leads to reduction of generation of spatter.

However, in the case where $(1.2/d) \times (Fs/15) \times Th1$ exceeds 10, the wire and the molten pool is more likely to be short-circuited, and spatter may increase, which is unfavorable. The aforementioned relationship is preferably 4.4 or less, more preferably 2.6 or less.

On the other hand, in the case where $(1.2/d) \times (Fs/15) \times Th1$ is less than 0.4, the molten droplet is not separated in the current maintaining section, the molten droplet is separated in the current increasing section, which will be described later, and larger particulate spatter is likely to be generated due to the arc reaction force, which is unfavorable. The aforementioned relationship is preferably 1.8 or more, more preferably equal to 2.2 or more.

Furthermore, the separation maintaining current Ih1 [A] and the wire feeding speed Fs [m/min] in the current maintaining section preferably satisfy the following relationship (2).

$$50 \leq (15/Fs) \times Ih1 \leq 280 \quad (2)$$

If the relationship between the separation maintaining current Ih1 [A] and the wire feeding speed Fs [m/min] falls within the aforementioned numerical range, it is possible to perform stable separation control of the molten droplet, which leads to reduction of generation of spatter.

However, in the case where $(15/Fs) \times Ih1$ exceeds 280, the molten droplet grows in the current maintaining section, and a short circuit with the molten pool occurs, and large particulate spatter is likely to be generated, which is unfavorable. The aforementioned relationship is preferably 250 or less, more preferably 200 or less.

On the other hand, in the case where $(15/Fs) \times Ih1$ is less than 50, there is a concern that arc stop occurs in the current maintaining section and the wire and the molten pool are short-circuited, which is unfavorable. The aforementioned relationship is preferably 120 or more, more preferably 140 or more.

In the current maintaining section, the molten droplet which has been in the suspended state in the current decreasing section is separated as illustrated in the schematic diagram of the states of the molten droplet in FIG. 2 (see (B) in the drawing), and an arc column is in a small state immediately after the separation (see (C) in the drawing).

(Current Increasing Section)

The current increasing section is provided to provide a calmly rising slope in order to prevent a short circuit between the wire and the molten pool. The slope of the welding current, which is the amount of change in welding current per unit time, in the current increasing section is preferably 50 A/ms to 300 A/ms. In the case where the aforementioned slope of the welding current exceeds 300 A/ms, there is a possibility that the molten droplet at the wire tip explodes due to an arc reaction force, which is unfavorable. The aforementioned slope of the welding current is preferably 200 A/ms or less, more preferably 150 A/ms or less.

On the other hand, in the case where the aforementioned slope of the welding current is less than 50 A/ms, there is a concern that the wire is short-circuited with the molten pool, which is unfavorable. The aforementioned slope of the welding current is preferably 100 A/ms or more, more preferably 120 A/ms or more.

In the current increasing section, as the welding current increases, the arc column increases in size and the molten droplet grows, as illustrated in the schematic diagram of the states of the molten droplet in FIG. 2 (see (D) in the drawing).

[Short-Circuit Prevention Control]

In the embodiment, generation of spatter when the molten droplet is separated is prevented by providing the current decreasing section, the current maintaining section, and the current increasing section in the separation control period and controlling the welding current after the separation detection of the molten droplet as described above, and a short circuit between the molten droplet and the molten pool is also prevented by introducing predetermined short-circuit prevention control in the separation control period as described below.

In the separation control period, with the decreasing of the welding current to prevent generation of spatter when the molten droplet is separated, the arc length is shortened, and thus the molten droplet and the molten pool are likely to be short-circuited. In the case where the molten droplet and the molten pool are short-circuited, spatter is likely to be generated due to the arc reaction force if a steep current rise occurs.

Therefore, in the case where the welding current is decreased in order to prevent generation of spatter when the molten droplet is separated, preventing a short circuit between the molten droplet and the molten pool is an important viewpoint for effectively preventing generation of spatter during welding.

Thus, at least one of the following (a) to (c) is performed as short-circuit prevention control in the separation control period in the embodiment.

(a) Control of an output voltage by maintaining the arc voltage during welding within ±10% with respect to a setting voltage
(b) Control of a feeding speed by decelerating a wire feeding speed Fs during welding to a range of 40% to 95% with respect to a setting wire feeding speed
(c) Control of a gas ratio by increasing an Ar ratio in the shielding gas to a range of 50% to 100% by volume The aforementioned short-circuit prevention controls (a) to (c) are similar in that these are methods for extending (widening) the arc length. It is possible to effectively prevent a short circuit between the molten droplet and the molten pool by controlling the arc length to be extended in the separation control period.

In this manner, it is possible to prevent not only generation of spatter at the time of separation of the molten droplet but also generation of spatter at the time of a short circuit in advance by preventing a short circuit between the molten droplet and the molten pool, by introducing short-circuit prevention control in the separation control period in which the welding current is controlled under predetermined conditions. As a result, it is possible to prevent both generation of spatter at the time of molten separation and generation of spatter at the time of a short circuit, so as to achieve an excellent bead appearance after the welding.

The aforementioned short-circuit prevention controls (a) to (c) may be used alone or two or more kinds thereof may be used in combination.

In relation to the aforementioned control (a) of an output voltage, in the case where the arc voltage exceeds +10% of the setting voltage, the directivity of the arc is weakened due to variations in arc length. Therefore, the arc localization becomes severe, leading to an unstable state. As a result, the bead shape deteriorates. On the other hand, in the case where the arc voltage is less than −10% of the setting voltage, there is a concern that the molten droplet at the wire tip is short-circuited with the molten pool. The aforementioned value is preferably within a range of ±5%, more preferably within a range of ±3%.

In regard to the aforementioned control (b) of a feeding speed, in the case where the deceleration rate of the wire feeding speed Fs with respect to the setting wire feeding speed exceeds 95%, there is a concern that the molten droplet at the wire tip is short-circuited with the molten pool, which is unfavorable. The aforementioned value is preferably 85% or less, more preferably 75% or less. On the other hand, in the case where the deceleration rate of the wire feeding speed Fs with respect to the setting wire feeding speed is less than 40%, the wire is not melted, the arc length becomes unstable, and this affects the bead appearance, which is unfavorable. The aforementioned value is preferably 50% or more.

In regard to the aforementioned control (c) of a gas ratio, in the case where the increased Ar ratio in the shielding gas is less than 50% by volume, spatter is generated due to the short circuit migration, which is unfavorable. The Ar ratio in the shielding gas is preferably equal to or greater than 80% by volume and is more preferably equal to or greater than 95% by volume.

Second Embodiment

Subsequently, a control method for gas-shielded arc welding according to the second embodiment will be described. As described above, the second embodiment is an example of the case where the separation detection of the molten droplet has been done in the forced separation arc period (Yes in Step S7).

Figure 3:
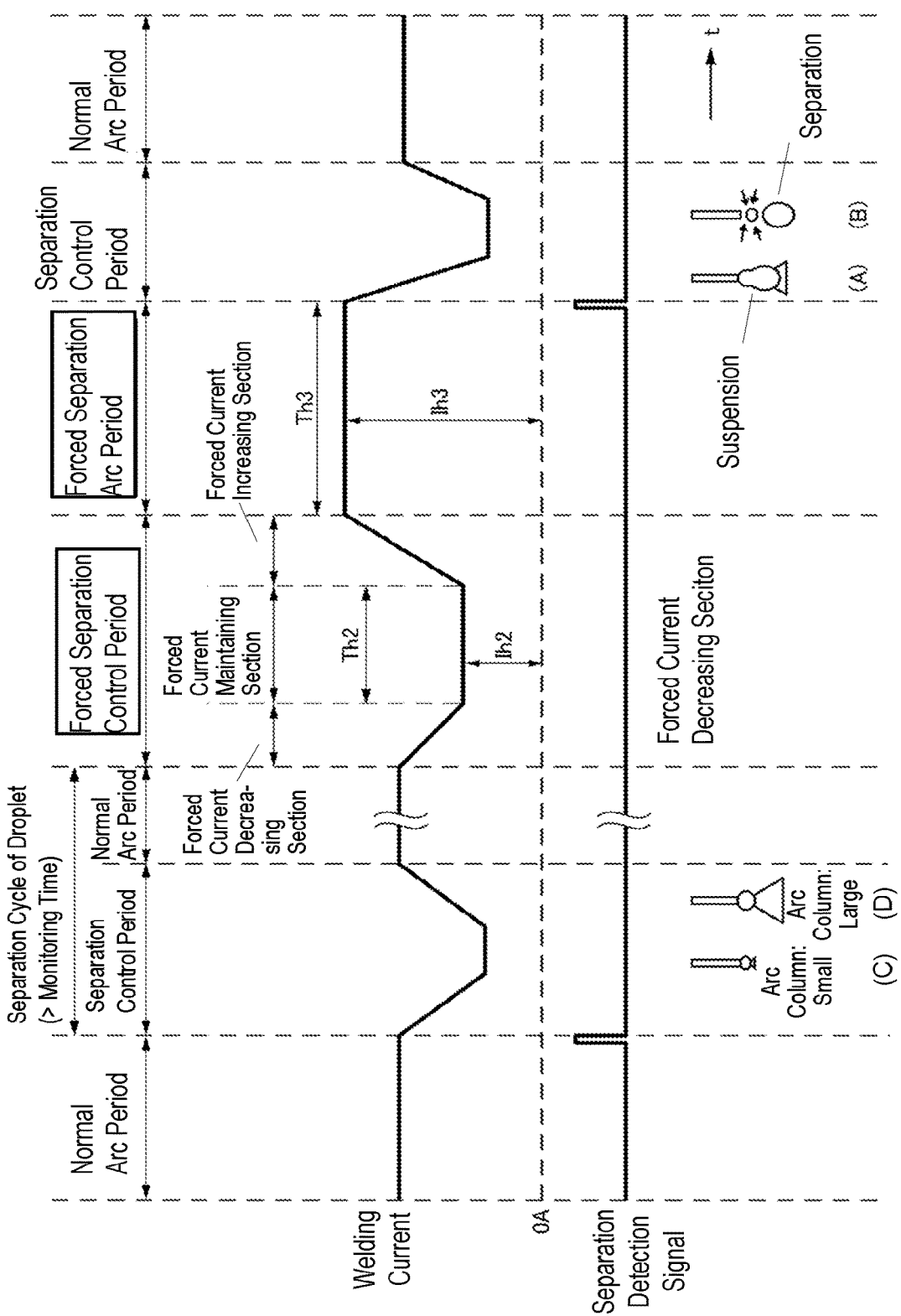
FIG. 3 is a schematic diagram for illustrating a waveform diagram of a welding current and a waveform diagram of a separation detection signal with respect to a time axis (t), and states of a molten droplet at predetermined timings in the waveform diagram, in a control method for gas-shielded arc welding according to a second embodiment of the present invention.

FIG. 3 is a schematic diagram for illustrating a waveform diagram of a welding current and a waveform diagram of a separation detection signal with respect to a time axis (t) and states of the molten droplet at predetermined timings in the waveform diagrams, in the control method for gas-shielded arc welding according to the second embodiment of the present invention. Hereinafter, detailed description will be given with reference to the drawing.

The control method for gas-shielded arc welding according to the second embodiment is the same as the first embodiment in that the separation cycle of the molten droplet includes two periods, namely the normal arc period and the separation control period. However, the second embodiment is different in that a forced separation control period to forcibly promote the separation of the molten droplet in the case where the separation cycle of the molten droplet has exceeded the monitoring time Tarc set in advance and the following forced separation arc period are provided.

[Monitoring Time Tarc]

The monitoring time Tarc is provided in order to prevent a short circuit between the molten droplet and the molten pool due to oversizing of the molten droplet that is caused in the case where the grown molten droplet is not easily separated. Typically, the constriction of the molten droplet grows in the normal arc period in which the setting current Icc is applied, and then the separation spontaneously occurs. However, in the case where the separation does not occur even in a stage where the molten droplet has grown to a certain level of size, the oversized molten droplet may be short-circuited with the molten pool. In order to prevent this, predetermined welding current control for forcibly promoting separation of the molten droplet is performed in the case where the separation cycle of the molten droplet exceeds the monitoring time Tarc set in advance.

The monitoring time Tarc is preferably 10 ms to 60 ms. In the case where the monitoring time Tarc is within the range of 10 ms to 60 ms, it is possible to prevent oversizing of the molten droplet, and this is effective for preventing generation of large particulate due to a short circuit between the molten droplet and the molten pool.

Also, the monitoring time Tarc [ms], the setting current Icc [A], and the wire diameter d [mm] of the welding wire preferably satisfy the following relationship (3).

$$10 \leq (d/1.2) \times (350/Icc) \times Tarc \leq 80 \quad (3)$$

The relationship of the monitoring time Tarc [ms], the setting current Icc [A], and the wire diameter d [mm] preferably falls within the aforementioned numerical range, because a short circuit between the oversized molten droplet and the molten pool is prevented. However, in the case where $(d/1.2) \times (350/Icc) \times Tarc$ exceeds 80, the molten droplet that is not separated is oversized, which is unfavorable. The aforementioned relationship is preferably 30 or less, more preferably 25 or less.

On the other hand, in the case where $(d/1.2) \times (350/Icc) \times Tarc$ is less than 10, the molten droplet is separated without growing to an ideal size, which is unfavorable. The aforementioned relationship is preferably 10 or more, and is more preferably 15 or more.

[Forced Separation Control Period]

In the case where the separation cycle of the molten droplet exceeds the monitoring time Tarc, switching to a welding current being lower than the welding current at the time of the detection (that is, the setting current Icc) is immediately performed, and the processing proceeds to the forced separation control period. The forced separation control period includes three sections, namely a forced current decreasing section in which the welding current is decreased under predetermined conditions, a forced current maintaining section in which the welding current is maintained at a constant forced separation maintaining current Ih2 for a predetermined forced separation maintaining time Th2 after the forced current decreasing section, and a forced current increasing section in which the welding current is increased under predetermined conditions after the forced current maintaining section.

(Forced Current Decreasing Section)

The forced current decreasing section is provided in order to prevent swinging of the growing molten droplet. More specifically, the molten droplet is less likely to be affected by the arc reaction force and is stably transitioned to a suspended state, by providing a forced current decreasing section immediately in the case where the separation cycle of the molten droplet exceeds the monitoring time Tarc.

The slope of the welding current, which is the amount of change in welding current per unit time, in the forced current decreasing section is preferably −100 A/ms or less. In the case where the aforementioned slope of the welding current exceeds −100 A/ms, there is a concern that the arc repulsion force becomes large, the molten droplet is further oversized in the forced current decreasing section, and the molten droplet and the molten pool are short-circuited, which is unfavorable. In the case where the aforementioned slope of the welding current is less than −500 A, there is a concern that the molten droplet becomes unstable, the wire is not melted, and a short circuit with the molten pool occurs, which is unfavorable. The aforementioned slope of the welding current is preferably −150 A/ms or less, more preferably −200 A/ms or less.

In the forced current decreasing section, the suspended state in which the constriction of the molten droplet is promoted is achieved.

(Forced Current Maintaining Section)

The forced current maintaining section is provided in order to promote the constriction formation of the molten droplet. More specifically, constriction of the molten droplet is more likely to be formed by providing the forced current maintaining section after the forced current decreasing section, and this contributes to promotion of the separation of the molten droplet in the forced current increasing section and the forced separation arc period, which will be described later.

The forced separation maintaining time Th2 of the welding current in the forced current maintaining section is preferably 1 ms to 5 ms. In the case where the forced separation maintaining time Th2 exceeds 5 ms, there is a concern that the molten droplet excessively approaches the molten pool and the molten droplet and the molten pool are short-circuited, which is unfavorable. The forced separation maintaining time Th2 is preferably 8 ms or less, more preferably 6 ms or less.

On the other hand, in the case where the forced separation maintaining time Th2 is less than 1 ms, there is a possibility that the molten droplet cannot be separated in the forced current maintaining section, the molten droplet explodes due to the arc reaction force strengthened in the forced current increasing section, which will be described later, and the molten droplet is transformed into spatter. The forced separation maintaining time Th2 is preferably 3 ms or more, more preferably 4 ms or more.

In the forced current maintaining section, the suspended state in which the constriction of the molten droplet is promoted is achieved, similarly to the forced current decreasing section.

(Forced Current Increasing Section)

The forced current increasing section is provided in order to promote stable growth of the molten droplet. More specifically, by providing the forced current increasing section after the forced current maintaining section, the molten droplet is less likely to be affected by the arc repulsion force and can stably grow, and swinging of the suspended molten droplet can be effectively prevented.

The slope of the welding current, which is the amount of change in welding current per unit time, in the forced current increasing section is preferably 10 A/ms to 300 A/ms. In the case where the aforementioned slope of the welding current exceeds 300 A/ms, the molten droplet is lifted by the repulsion force, and large particulate spatter is likely to be generated, which is unfavorable. The aforementioned slope of the welding current is preferably 250 A/ms or less, more preferably 200 A/ms or less.

On the other hand, in the case where the aforementioned slope of the welding current is less than 10 A/ms, there is a concern that the molten droplet is further oversized and the molten droplet and the molten pool are short-circuited, which is unfavorable. The aforementioned slope of the welding current is preferably 100 A/ms or more, more preferably 150 A/ms or more.

In the forced current increasing section, as the welding current is increased, the arc column increases in size and the molten droplet further grows.

[Forced Separation Arc Period]

In the forced separation arc period, a forced arc maintaining current Ih3 that is a welding current larger than the setting current Icc is applied in order to forcibly separate the molten droplet that has not been able to be fully separated in the monitoring time Tarc. That is, this is a mechanism in which a strong electromagnetic pinch force is applied to the molten droplet to forcibly separate the molten droplet by applying a constant current larger than the setting current Icc applied in the normal arc period.

The forced arc maintaining current Ih3 is preferably 1.20 to 2.50 times the setting current Icc. In the case where the forced arc maintaining current Ih3 exceeds 2.50 times the setting current Icc, the suspended molten droplet is likely to swing, and large particulate spatter is likely to be generated, which is unfavorable. The aforementioned value is preferably 2.30 times the setting current Icc or less, more preferably 2.00 times or less.

On the other hand, it is not preferable that the forced arc maintaining current Ih3 is less than 1.20 times the setting current Icc, because a strong electromagnetic pinch force is not easily applied to the droplet and the droplet may be difficult to be separated. The aforementioned value is preferably 1.60 times the setting current Icc or more, more preferably 1.80 times or more.

When the separation of the molten droplet is detected in the forced separation arc period, switching to a welding current lower than the welding current at the time of the detection is immediately performed, and the processing proceeds to the aforementioned separation control period. Then, similarly to the description of the first embodiment, the separation cycle of the molten droplet is repeated. Further, the molten droplet having been brought into the suspended state in the forced separation control period and the forced separation arc period is forcibly separated due to an influence of the electromagnetic pinch force (see (A) and (B) in FIG. 3).

[Separation Detection Means]

As described above, a separation detection signal using an arc voltage or an arc resistance is suitably used as a method for detecting the separation timing of the molten droplet, and it is preferable to perform the detection using the arc voltage (including a time differential value and a time second-order differential value of the arc voltage) in the forced separation arc period. In the period, it is possible to precisely detect the separation timing of the molten droplet only from the variations in arc voltage since the period is a constant current control section and variations in welding current value are small. Further, since it is not necessary to consider the variations in welding current in performing a predetermined arithmetic operation, it is possible to shorten an arithmetic operation time and to quickly perform the separation detection.

On the other hand, in the normal arc period, it is preferable to perform the detection using the arc resistance (including the time differential value and the time second-order differential value of the arc resistance), that is, the arc voltage/the welding current. In order to precisely detect the separation timing of the molten droplet in the period, it is also necessary to consider influences of variations in welding current. It is thus preferable to perform the detection using the arc resistance, which reflects the influences of both the arc voltage and the welding current.

Third Embodiment

Furthermore, a control method for gas-shielded arc welding according to the third embodiment will be described. As described above, the third embodiment is an example of the case where the separation detection of the molten droplet has been done in the forced separation control period (Yes in Step S5).

Figure 4:
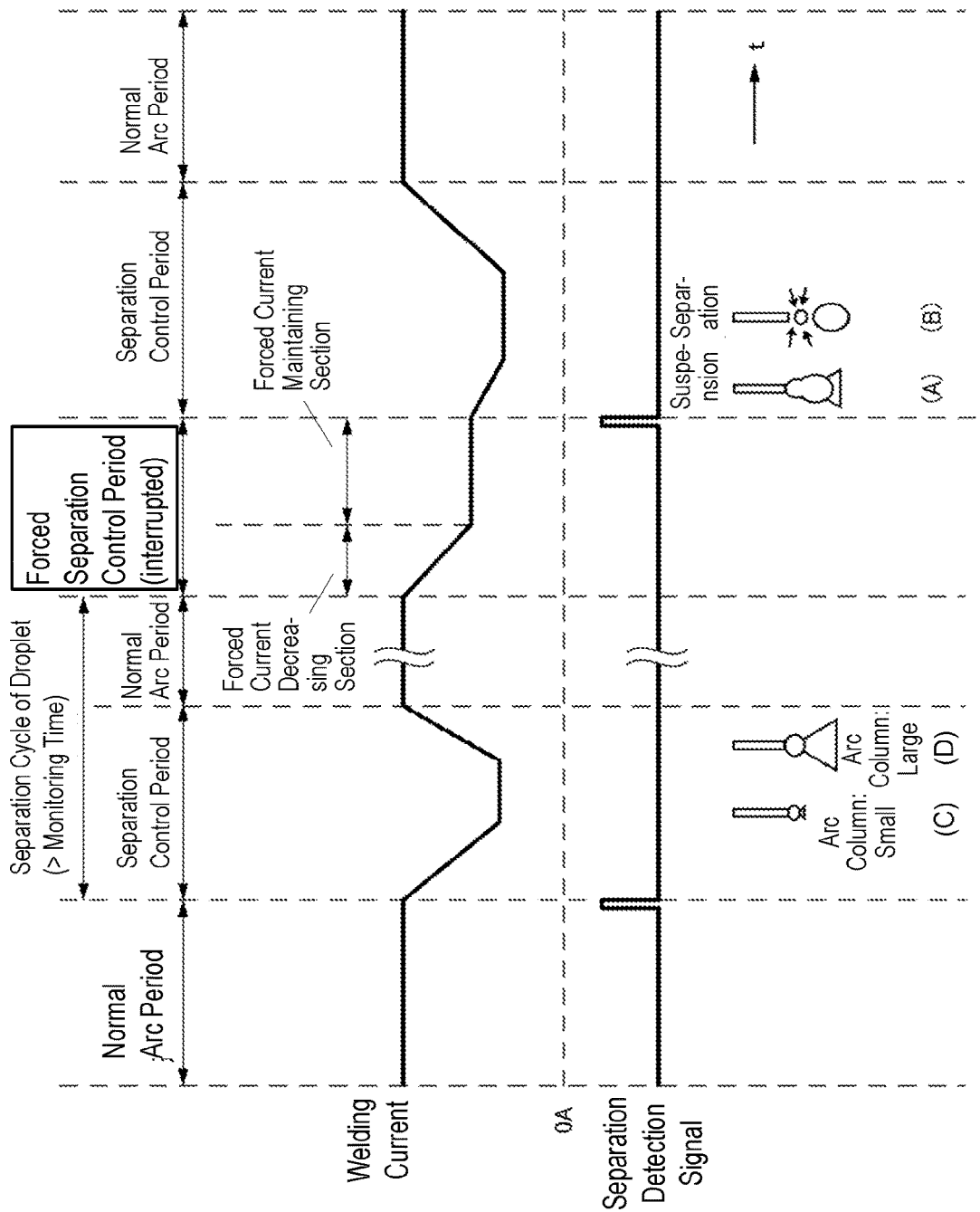
FIG. 4 is a schematic diagram for illustrating a waveform diagram of a welding current and a waveform diagram of a separation detection signal with respect to a time axis (t), and states of a molten droplet at predetermined timings in the waveform diagram, in a control method for gas-shielded arc welding according to a third embodiment of the present invention.

FIG. 4 is a schematic diagram for illustrating a waveform diagram of a welding current and a waveform diagram of a separation detection signal with respect to the time axis (t) and states of the molten droplet at predetermined timings in the waveform diagrams in the control method for gas-shielded arc welding according to the third embodiment of the present invention. Hereinafter, differences from the second embodiment will mainly be described in detail with reference to the drawing.

The control method for gas-shielded arc welding according to the third embodiment is the same as the second embodiment in that the forced separation control period for forcibly promoting the separation of the molten droplet in the case where the separation cycle of the molten droplet exceeds the monitoring time Tarc set in advance is provided.

However, in the embodiment, in the case where separation detection of the molten droplet has been done at any timing in the forced separation control period (in the forced current maintaining section in the example in FIG. 4), a current control process in the forced separation control period is interrupted, switching to a welding current lower than the welding current at the time of the detection is immediately performed, the processing proceeds to the aforementioned separation control period. Then, similarly to the description of the first embodiment, the separation cycle of the molten droplet is repeated.

<Control System for Gas Shielded Arc Welding>

Figure 5:
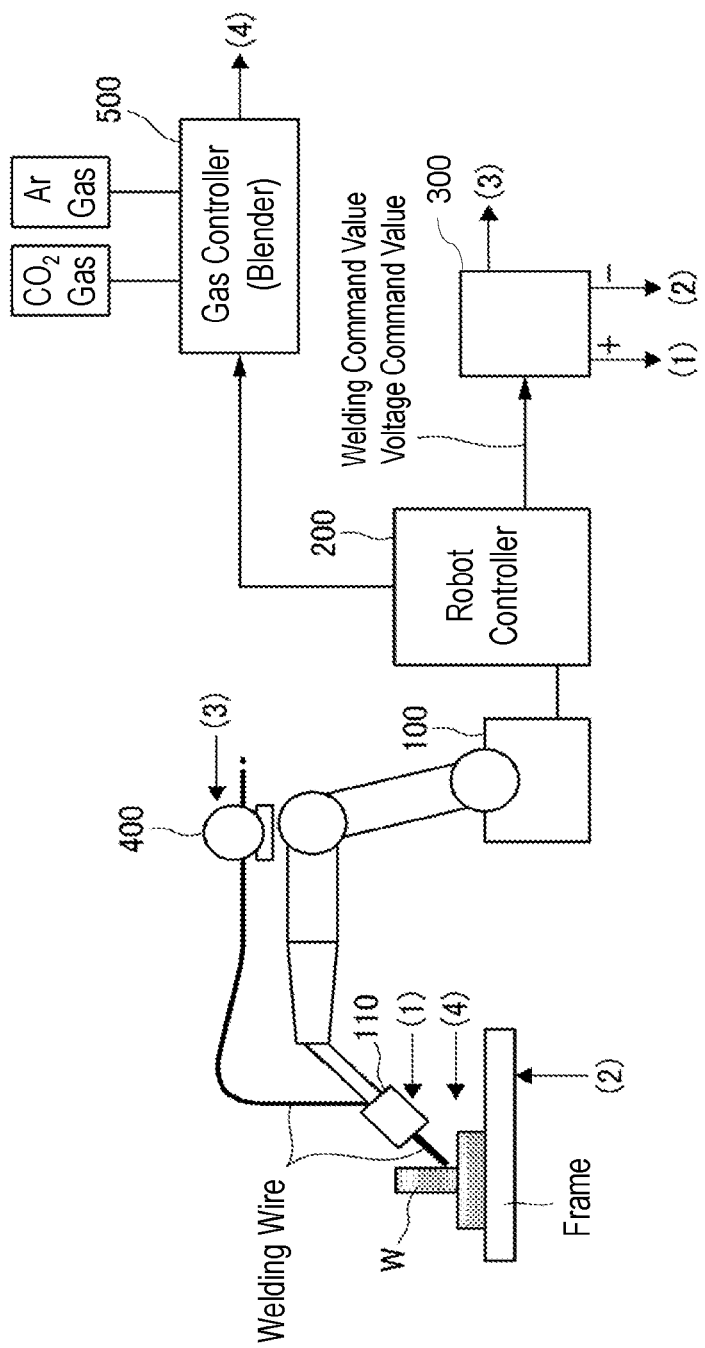
FIG. 5 is a diagram for illustrating an overview configuration of a welding system for gas-shielded arc welding according to the embodiment.

Furthermore, a control system for gas-shielded arc welding according to the embodiment will be described. FIG. 5 is a diagram for illustrating an example of an overview configuration of the welding system for a gas-shielded arc welding according to the embodiment.

As illustrated in FIG. 5, the welding system according to the embodiment includes a welding robot 100, a robot controller 200, a welding power source 300, a feeding apparatus 400, and a gas controller (blender) 500. The welding power source 300 is connected to an electrode side via a positive power cable (1) and is connected to a workpiece W via a negative power cable (2). In addition, a power cable (3) in the drawing connects the welding power source 300 to the feeding apparatus 400 of the welding wire and controls the feeding speed of the welding wire.

The welding robot 100 generates an arc from the electrode and welds the workpiece W as a target of the welding with the heat. Here, the welding robot 100 includes a welding torch 110 as a welding torch to maintain the electrode.

At the tip of the welding torch 110, the welding wire serving as the electrode is maintained to have a constant extension from the tip of a cylindrical conductive body called a contact tip. The welding method applied in the embodiment is a consumable electrode type welding method performed by bringing the contact tip and the welding wire into contact with each other, applying the arc voltage and conducting electrically to generate an arc between the workpiece W and the welding wire tip, and melting the welding wire.

Further, the welding torch 110 includes a shielding gas nozzle (a mechanism to eject shielding gas) and is connected to a gas controller 500 configured to control the gas supply amount and the gas ratio of the shielding gas, such as $CO_2$ gas and Ar gas, via a gas hose (4). In addition, the gas controller 500 is connected to a gas cylinder containing the $CO_2$ gas or the Ar gas.

The robot controller 200 issues a command for operating the welding robot 100, a command for controlling a power source (a current value, a voltage value, and the like) for the welding power source 300, a command for controlling the gas supply amount and the gas ratio for the gas controller 500, and the like. Further, the robot controller 200 also includes a welding current control apparatus for detecting separation of the molten droplet using predetermined means and controlling the welding current to be supplied to the welding wire, as described later.

The welding power source 300 supplies electric power to the electrode and the workpiece W in accordance with the command from the robot controller 200, thereby generating an arc between the electrode and the workpiece W. In addition, the welding power source 300 supplies electric power to the feeding apparatus 400 in accordance with the command from the robot controller 200. The current in the welding operation may be either a direct current or an alternating current, and the waveform is not particularly limited and may be a pulse such as a rectangular wave or a triangular wave.

The feeding apparatus 400 feeds the welding wire to the welding torch 110 with progress of the welding operation. The welding wire fed by the feeding apparatus 400 is not particularly limited and is selected depending on characteristics of the workpiece W, a welding form, and the like. For example, a solid wire or a flux-cored wire is used. Further, a material of the welding wire is not limited, and for example, the material may be mild steel or may be a material such as stainless steel, aluminum, or titanium. Furthermore, the diameter of the welding wire is not particularly limited.

<Welding Current Control Apparatus>

Figure 6:
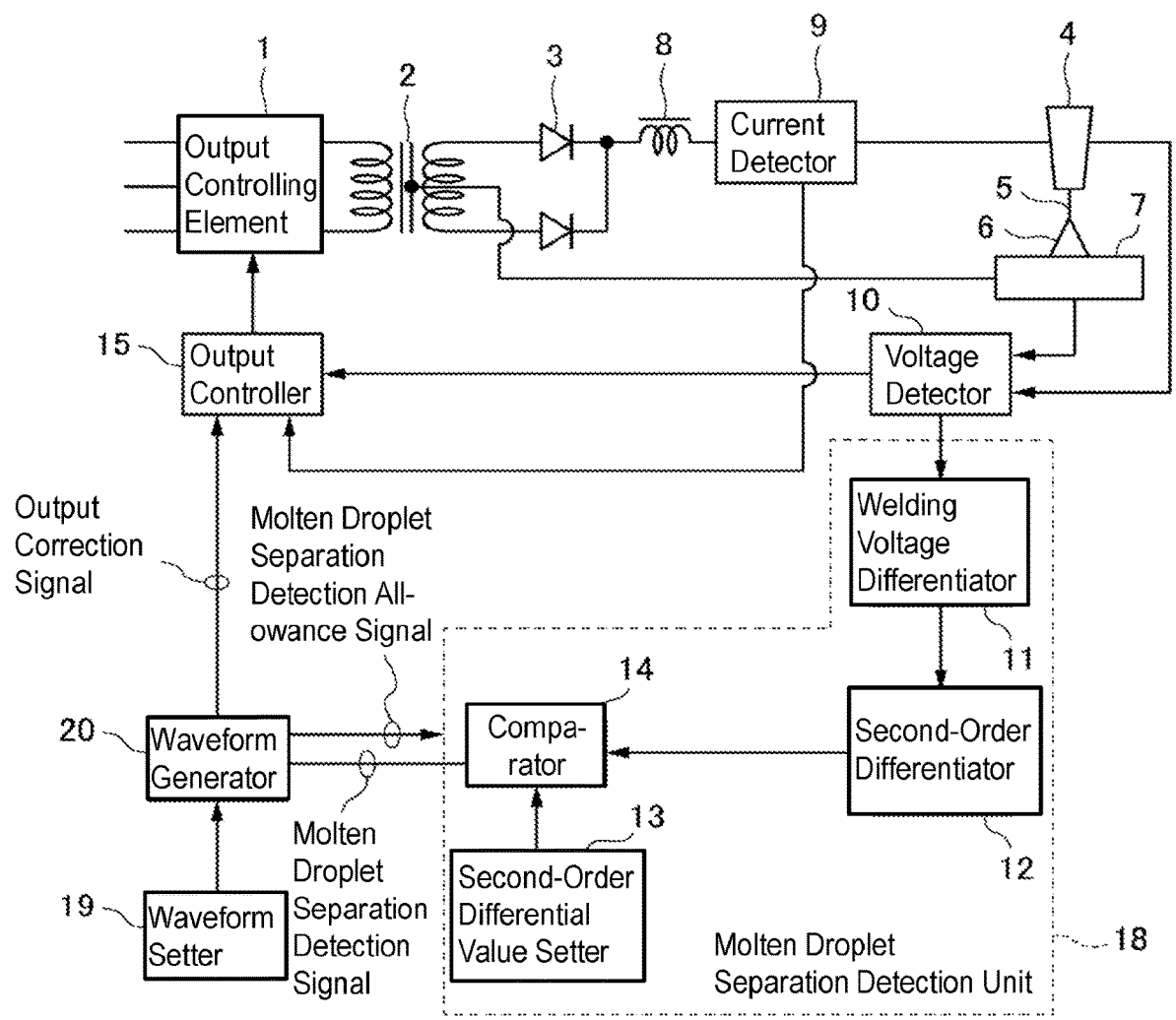
FIG. 6 is a block diagram for illustrating a welding current control apparatus in the case where detection of molten droplet separation is performed using an arc voltage.

FIG. 6 is a block diagram for illustrating a welding current control apparatus in the case where predetermined control is performed by detecting separation of the molten droplet or a timing immediately before the separation using a time second-order differential value of the arc voltage. An output control element 1 is connected to a three-phase AC power source (not illustrated), and a current provided to the output control element 1 is provided to a contact tip 4 via a transformer 2, a rectifying unit 3 including a diode, a DC reactor 8, and a current detector 9 configured to detect the welding current. A welded material 7 is connected to a low power source side of the transformer 2, and a welding arc 6 is generated between the welding wire 5, which is inserted into the contact tip 4 and to which power is supplied, and the welded material 7.

The arc voltage between the contact tip 4 and the welded material 7 is detected by the voltage detector 10 and is then input to the output controller 15. The detection value of the welding current is further input from the current detector 9 to the output controller 15, and the output controller 15 controls the welding current to be supplied to the wire 5 on the basis of the arc voltage and the welding current.

The arc voltage detected by the voltage detector 10 is input to the welding voltage differentiator 11 of a molten droplet separation detection unit 18, and a time first-order differentiation is arithmetically operated by the welding voltage differentiator 11. Next, the first-order differential value of the welding voltage is input to a second-order differentiator 12, and a time second-order differentiation of the arc voltage is arithmetically operated by the second-order differentiator 12. Then, the time second-order differential value is input to a comparator 14. A second-order differentiation setting value (threshold value) is input to and set for the second-order differential value setter 13, and the comparator 14 compares the second-order differential value from the second-order differentiator 12 with the setting value (threshold value) from the second-order differential value setter 13, and outputs the molten droplet separation detection signal at the moment at which the second-order differential value exceeds the setting value.

The moment at which the second-order differential value exceeds the setting value is determined to be a timing at which the molten droplet is separated from the wire end or a timing immediately before the separation.

The molten droplet separation detection signal is input to a waveform generator 20, a welding current waveform after the separation of the molten droplet is controlled in the waveform generator 20, and an output correction signal is input to the output controller 15. When the molten droplet separation detection signal is input, the waveform generator 20 outputs a control signal (output correction signal) to the output controller 15 so as to achieve a predetermined welding value lower than the welding current value at the time of the detection (that is, the setting current value Icc) in the period set in the waveform generator 20. As a result, current control in the current decreasing section in the separation control period as described above is performed. Thereafter, a predetermined control signal is output from the waveform generator 20 to follow the current maintaining section and the current increasing section.

The waveform setter 19 is configured to input a period during which the output correction signal is output and welding current control conditions in the waveform generator 20, and the period during which the output correction signal is output and the welding current control conditions are set in the waveform generator 20 by the waveform setter 19.

The molten droplet detection signal is a signal output in the case where the separation of the molten droplet or a timing immediately before the separation is detected. When the molten droplet is separated, the root of the molten droplet at the wire tip is constricted, and as a result of the constriction advancing, the arc voltage and the arc resistance increase. Further, since the arc length is extended when the molten droplet is separated, the arc voltage and the arc resistance increase. In the case where the detection is performed using the arc voltage and the arc resistance or differential values thereof, and if the welding conditions change during the welding, the molten droplet separation detection unit frequently causes erroneous detection due to influences of a change in welding conditions, which leads to an increase of spatter.

However, in the case of a detection using a second-order differential value, it is possible to accurately detect separation of the molten droplet without being influenced by a change in welding conditions even if the welding conditions change during the welding. Further, in the case where the second-order differential value setter 13 sets a second-order differential value corresponding to a change in arc voltage or arc resistance due to the constriction immediately before the separation of the molten droplet, it is possible to detect the timing immediately before the separation of the molten droplet and to control the welding waveform and it is thus possible to completely solve the problem of blowing off the molten solution remaining at the wire tip to generate small particulate spatter.

Figure 7:
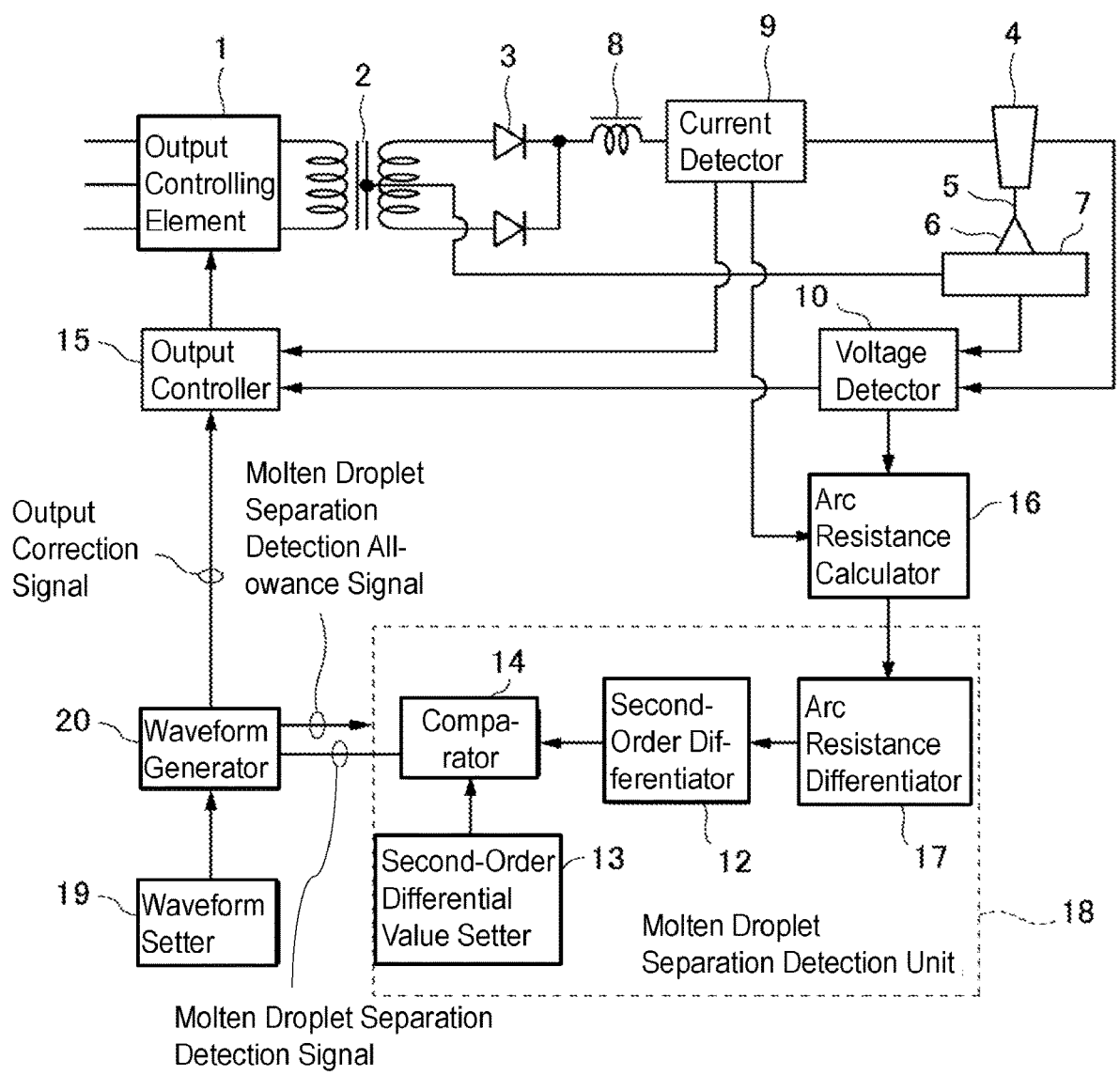
FIG. 7 is a block diagram for illustrating a welding current control apparatus in the case where detection of molten droplet separation is performed using an arc resistance.

FIG. 7 is a block diagram for illustrating a welding control apparatus in the case where predetermined control is performed by detecting separation of the molten droplet or a timing immediately before the separation using a time second-order differential value of an arc resistance. The molten droplet separation detection unit 18 in the drawing is provided with an arc resistance differentiator 17 instead of the welding voltage differentiator 11. Outputs of the voltage detector 10 and the current detector 9 are input to the arc resistance calculator 16, and the arc resistance calculator 16 divides the voltage by the current, thereby calculating the arc resistance. The calculated value of the arc resistance is input to the arc resistance differentiator 17, is subjected to first differentiation in the arc resistance differentiator 17, and is then subjected to second-order differentiator in the second-order differentiator 12. The second-order differential value of the arc resistance is compared with the second-order differential setting value (threshold value) input from the second-order differentiation setter 13 by the comparator 14, and the molten droplet separation detection signal is output at the moment at which the second-order differential value of the arc resistance exceeds the setting value.

Examples

Hereinafter, the present invention will further specifically be described by listing examples. The present invention is not limited to these examples, and various modifications can be added and carried out within a scope that can adapt the gist of the present invention, all of which are covered by the technical scope of the present invention.

<Welding Conditions>

A torch slope angle with respect to a base material was set to 45°, and a common welding wire (consumable-type electrode) with a composition that conformed to JIS Z3312: 2009 YGW11 was used.

Further, initial conditions for the welding and conditions of the welding wire, the short circuit prevention control and the separation control period are listed in Tables 1 to 4.

(Initial Conditions for Welding)

Kind of shielding gas ("%" indicates % by volume)

Setting current Icc (A)

Setting voltage (V)

(Welding Wire)

Setting feed speed Fs (m/min)

Extension (mm)

Wire diameter d (mm)

(Short-Circuit Prevention Control)

Output voltage control

Control condition (within what % the arc voltage is to be maintained with respect to the setting voltage)

Whether to apply the control (control ON/OFF)

Feeding speed control

Control condition (to what % the wire feeding speed is to be decelerated with respect to the setting wire feeding speed)

Whether to apply the control (control ON/OFF)

Gas ratio control

Control condition (to what % by volume the Ar ratio in the shielding gas is to be increased)

Whether to apply the control (control ON/OFF)

(Separation Control Period)

Current decreasing section

Slope of welding current (A/ms)

Current maintaining section

Separation maintaining time Th1 (ms)

Separation maintaining current Ih1 (A)

$(1.2/d) \times (Fs/15) \times Th1$  Value represented by Expression (1)

$(15/Fs) \times Ih1$  Value represented by Expression (2)

Current increasing section

Slope of welding current (A/ms)

TABLE 1

| | | Initial conditions of welding | | Welding wire Setting wire feeding speed (m/min) | Wire Extension (mm) | Welding wire diameter d (mm) | Short-circuit prevention control | | | | |
|---|---|---|---|---|---|---|---|---|---|---|---|
| | | | | | | | Output voltage control | | Feeding speed control | | Gas ratio control |
| Test No. | Shielding gas | Setting current Icc (A) | Setting voltage (V) | | | | Control condition | Control ON/OFF | Control condition | Control ON/OFF | Control condition |
| 1 | 100% CO$_2$ | 300 | 35 | 13.2 | 22 | 1.2 | 5% | ON | 100% (13.2 m/min) | OFF | 100% CO$_2$ |
| 2 | 70% Ar + 30% CO$_2$ | 320 | 35 | 13.2 | 22 | 1.2 | 5% | ON | 100% (13.2 m/min) | OFF | 70% Ar + 30% CO$_2$ |
| 3 | 100% CO$_2$ | 320 | 35 | 13.2 | 15 | 1.2 | 5% | ON | 100% (13.2 m/min) | OFF | 100% CO$_2$ |
| 4 | 100% CO$_2$ | 280 | 35 | 13.2 | 30 | 1.2 | 5% | ON | 100% (13.2 m/min) | OFF | 100% CO$_2$ |
| 5 | 100% CO$_2$ | 300 | 35 | 9.8 | 22 | 1.4 | 5% | ON | 100% (13.2 m/min) | OFF | 100% CO$_2$ |
| 6 | 100% CO$_2$ | 320 | 35 | 9.8 | 15 | 1.4 | 5% | ON | 100% (13.2 m/min) | OFF | 100% CO$_2$ |
| 7 | 100% CO$_2$ | 280 | 35 | 9.8 | 30 | 1.4 | 5% | ON | 100% (13.2 m/min) | OFF | 100% CO$_2$ |
| 8 | 100% CO$_2$ | 280 | 35 | 13.2 | 22 | 1.2 | −5% | ON | 100% (13.2 m/min) | OFF | 100% CO$_2$ |
| 9 | 100% CO$_2$ | 280 | 35 | 13.2 | 22 | 1.2 | 6% | ON | 100% (13.2 m/min) | OFF | 100% CO$_2$ |
| 10 | 100% CO$_2$ | 280 | 35 | 13.2 | 22 | 1.2 | −6% | ON | 100% (13.2 m/min) | OFF | 100% CO$_2$ |
| 11 | 100% CO$_2$ | 280 | 35 | 13.2 | 22 | 1.2 | 10% | ON | 100% (13.2 m/min) | OFF | 100% CO$_2$ |
| 12 | 100% CO$_2$ | 280 | 35 | 13.2 | 22 | 1.2 | −10% | ON | 100% (13.2 m/min) | OFF | 100% CO$_2$ |
| 13 | 100% CO$_2$ | 280 | 35 | 13.2 | 22 | 1.2 | 0% | ON | 100% (13.2 m/min) | OFF | 100% CO$_2$ |
| 14 | 100% CO$_2$ | 280 | 35 | 13.2 | 22 | 1.2 | — | OFF | 100% (13.2 m/min) | OFF | 50% Ar + 50% CO$_2$ |
| 15 | 100% CO$_2$ | 280 | 35 | 13.2 | 22 | 1.2 | — | OFF | 100% (13.2 m/min) | OFF | 100%Ar |
| 16 | 100% CO$_2$ | 280 | 35 | 13.2 | 22 | 1.2 | — | OFF | 50% (6.6 m/min) | ON | 70% Ar + 30% CO$_2$ |
| 17 | 100% CO$_2$ | 280 | 35 | 13.2 | 22 | 1.2 | — | OFF | 90% (12.8 m/min) | ON | 80% Ar + 20% CO$_2$ |
| 18 | 100% CO$_2$ | 280 | 35 | 13.2 | 22 | 1.2 | — | OFF | 95% (12.8 m/min) | ON | 80% Ar + 20% CO$_2$ |
| 19 | 100% CO$_2$ | 280 | 35 | 13.2 | 22 | 1.2 | — | OFF | 40% (5.2 m/min) | ON | 100% CO$_2$ |
| 20 | 100% CO$_2$ | 280 | 35 | 13.2 | 22 | 1.2 | 5% | ON | 100% (13.2 m/min) | OFF | 80% Ar + 20% CO$_2$ |
| 21 | 100% CO$_2$ | 280 | 35 | 13.2 | 22 | 1.2 | 5% | ON | 90% (12.8 m/min) | ON | 100% CO$_2$ |
| 22 | 100% CO$_2$ | 280 | 35 | 13.2 | 22 | 1.2 | — | OFF | 90% (12.8 m/min) | ON | 80% Ar + 20% CO$_2$ |
| 23 | 100% CO$_2$ | 280 | 35 | 13.2 | 22 | 1.2 | 5% | ON | 90% (12.8 m/min) | ON | 80% Ar + 20% CO$_2$ |

| | | | Separation control period | | | | |
|---|---|---|---|---|---|---|---|
| | | | Current decreasing section | Current maintaining section | | Current increasing section | |
| Test No. | Short-circuit prevention control Gas ratio control Control ON/OFF | | Slope of welding current (A/ms) | Separation maintaining time Th1 (ms) | Separation maintaining current Ih1 (A) | Expression (1) | Expression (2) | Slope of welding current (A/ms) |
| 1 | OFF | | −100 | 5 | 150 | 4.4 | 170.5 | 200 |
| 2 | OFF | | −100 | 5 | 150 | 4.4 | 170.5 | 200 |
| 3 | OFF | | −100 | 5 | 150 | 4.4 | 170.5 | 200 |
| 4 | OFF | | −100 | 5 | 150 | 4.4 | 170.5 | 200 |
| 5 | OFF | | −100 | 5 | 150 | 2.8 | 229.6 | 200 |
| 6 | OFF | | −100 | 5 | 150 | 2.8 | 229.6 | 200 |
| 7 | OFF | | −100 | 5 | 150 | 2.8 | 229.6 | 200 |
| 8 | OFF | | −100 | 5 | 150 | 4.4 | 170.5 | 200 |
| 9 | OFF | | −100 | 5 | 150 | 4.4 | 170.5 | 200 |
| 10 | OFF | | −100 | 5 | 150 | 4.4 | 170.5 | 200 |
| 11 | OFF | | −100 | 5 | 150 | 4.4 | 170.5 | 200 |
| 12 | OFF | | −100 | 5 | 150 | 4.4 | 170.5 | 200 |
| 13 | OFF | | −100 | 5 | 150 | 4.4 | 170.5 | 200 |
| 14 | ON | | −100 | 5 | 150 | 4.4 | 170.5 | 200 |

TABLE 1-continued

| | | | | | | | |
|---|---|---|---|---|---|---|---|
| 15 | ON | −100 | 5 | 150 | 4.4 | 170.5 | 200 |
| 16 | ON | −100 | 5 | 150 | 4.4 | 170.5 | 200 |
| 17 | ON | −100 | 5 | 150 | 4.4 | 170.5 | 200 |
| 18 | ON | −100 | 5 | 150 | 4.4 | 170.5 | 200 |
| 19 | OFF | −100 | 5 | 150 | 4.4 | 170.5 | 200 |
| 20 | ON | −100 | 5 | 150 | 4.4 | 170.5 | 200 |
| 21 | OFF | −100 | 5 | 150 | 4.4 | 170.5 | 200 |
| 22 | ON | −100 | 5 | 150 | 4.4 | 170.5 | 200 |
| 23 | ON | −100 | 5 | 150 | 4.4 | 170.5 | 200 |

TABLE 2

| Test No. | Initial conditions of welding | | | Welding wire | | | Short-circuit prevention control | | | | |
|---|---|---|---|---|---|---|---|---|---|---|---|
| | Shielding gas | Setting current Icc (A) | Setting voltage (V) | Setting wire feeding speed (m/min) | Extension (mm) | Wire diameter d (mm) | Output voltage control | | Feeding speed control | | Gas ratio control |
| | | | | | | | Control condition | Control ON/OFF | Control condition | Control ON/OFF | Control condition |
| 24 | 100% $CO_2$ | 300 | 35 | 13.2 | 22 | 1.2 | 5% | ON | 100% (13.2 m/min) | OFF | 100% $CO_2$ |
| 25 | 100% $CO_2$ | 300 | 35 | 13.2 | 22 | 1.2 | 5% | ON | 100% (13.2 m/min) | OFF | 100% $CO_2$ |
| 26 | 100% $CO_2$ | 300 | 35 | 13.2 | 22 | 1.2 | 5% | ON | 100% (13.2 m/min) | OFF | 100% $CO_2$ |
| 27 | 100% $CO_2$ | 300 | 35 | 13.2 | 22 | 1.2 | 5% | ON | 100% (13.2 m/min) | OFF | 100% $CO_2$ |
| 28 | 100% $CO_2$ | 300 | 35 | 13.2 | 22 | 1.2 | 5% | ON | 100% (13.2 m/min) | OFF | 100% $CO_2$ |
| 29 | 100% $CO_2$ | 300 | 35 | 13.2 | 22 | 1.2 | 5% | ON | 100% (13.2 m/min) | OFF | 100% $CO_2$ |
| 30 | 100% $CO_2$ | 300 | 35 | 13.2 | 22 | 1.2 | 5% | ON | 100% (13.2 m/min) | OFF | 100% $CO_2$ |
| 31 | 100% $CO_2$ | 300 | 35 | 13.2 | 22 | 1.2 | 5% | ON | 100% (13.2 m/min) | OFF | 100% $CO_2$ |
| 32 | 100% $CO_2$ | 300 | 35 | 16.8 | 22 | 1 | 5% | ON | 100% (13.2 m/min) | OFF | 100% $CO_2$ |
| 33 | 100% $CO_2$ | 300 | 35 | 6.2 | 22 | 1.6 | 5% | ON | 100% (13.2 m/min) | OFF | 100% $CO_2$ |
| 34 | 100% $CO_2$ | 300 | 35 | 16.8 | 22 | 1 | 5% | ON | 100% (13.2 m/min) | OFF | 100% $CO_2$ |
| 35 | 100% $CO_2$ | 180 | 35 | 3.4 | 22 | 1.6 | 5% | ON | 100% (13.2 m/min) | OFF | 100% $CO_2$ |
| 36 | 100% $CO_2$ | 300 | 35 | 13.2 | 22 | 1.2 | 5% | ON | 100% (13.2 m/min) | OFF | 100% $CO_2$ |
| 37 | 100% $CO_2$ | 300 | 35 | 13.2 | 22 | 1.2 | 5% | ON | 100% (13.2 m/min) | OFF | 100% $CO_2$ |
| 38 | 100% $CO_2$ | 300 | 35 | 13.2 | 22 | 1.2 | 5% | ON | 100% (13.2 m/min) | OFF | 100% $CO_2$ |
| 39 | 100% $CO_2$ | 300 | 35 | 13.2 | 22 | 1.2 | 5% | ON | 100% (13.2 m/min) | OFF | 100% $CO_2$ |
| 40 | 100% $CO_2$ | 300 | 35 | 13.2 | 22 | 1.2 | 5% | ON | 100% (13.2 m/min) | OFF | 100% $CO_2$ |
| 41 | 100% $CO_2$ | 300 | 35 | 13.2 | 22 | 1.2 | 5% | ON | 100% (13.2 m/min) | OFF | 100% $CO_2$ |
| 42 | 100% $CO_2$ | 300 | 35 | 13.2 | 22 | 1.2 | 5% | ON | 100% (13.2 m/min) | OFF | 100% $CO_2$ |
| 43 | 100% $CO_2$ | 300 | 35 | 13.2 | 22 | 1.2 | 5% | ON | 100% (13.2 m/min) | OFF | 100% $CO_2$ |
| 44 | 100% $CO_2$ | 300 | 35 | 13.2 | 22 | 1.2 | 5% | ON | 100% (13.2 m/min) | OFF | 100% $CO_2$ |
| 45 | 100% $CO_2$ | 300 | 35 | 13.2 | 22 | 1.2 | 5% | ON | 100% (13.2 m/min) | OFF | 100% $CO_2$ |

TABLE 2-continued

| | | Separation control period | | | | | |
|---|---|---|---|---|---|---|---|
| | | Current decreasing section | | Current maintaining section | | Current increasing section | |
| Test No. | Short-circuit prevention control Gas ratio control Control ON/OFF | Slope of welding current (A/ms) | Separation maintaining time Th1 (ms) | Separation maintaining current Ih1 (A) | Expression (1) | Expression (2) | Slope of welding current (A/ms) |
| 24 | OFF | −50 | 5 | 150 | 4.4 | 170.5 | 200 |
| 25 | OFF | −200 | 5 | 150 | 4.4 | 170.5 | 200 |
| 26 | OFF | −40 | 5 | 150 | 4.4 | 170.5 | 200 |
| 27 | OFF | −210 | 5 | 150 | 4.4 | 170.5 | 200 |
| 28 | OFF | −100 | 8 | 150 | 7.0 | 170.5 | 200 |
| 29 | OFF | −100 | 2 | 150 | 1.8 | 170.5 | 200 |
| 30 | OFF | −100 | 9 | 150 | 7.9 | 170.5 | 200 |
| 31 | OFF | −100 | 1 | 150 | 0.9 | 170.5 | 200 |
| 32 | OFF | −100 | 7 | 150 | 9.4 | 133.9 | 200 |
| 33 | OFF | −100 | 2 | 150 | 0.6 | 362.9 | 200 |
| 34 | OFF | −100 | 8 | 150 | 10.8 | 133.9 | 200 |
| 35 | OFF | −100 | 2 | 150 | 0.3 | 661.8 | 200 |
| 36 | OFF | −100 | 5 | 150 | 4.4 | 170.5 | 200 |
| 37 | OFF | −100 | 5 | 150 | 4.4 | 170.5 | 200 |
| 38 | OFF | −100 | 5 | 245 | 4.4 | 278.4 | 200 |
| 39 | OFF | −100 | 5 | 50 | 4.4 | 56.8 | 200 |
| 40 | OFF | −210 | 5 | 250 | 4.4 | 284.1 | 200 |
| 41 | OFF | −210 | 5 | 40 | 4.4 | 45.5 | 200 |
| 42 | OFF | −100 | 5 | 150 | 4.4 | 170.5 | 300 |
| 43 | OFF | −100 | 5 | 150 | 4.4 | 170.5 | 50 |
| 44 | OFF | −100 | 5 | 250 | 4.4 | 284.1 | 310 |
| 45 | OFF | −100 | 5 | 40 | 4.4 | 45.5 | 40 |

TABLE 3

| | Initial conditions of welding | | | Welding wire | | | Short-circuit prevention control | | | | |
|---|---|---|---|---|---|---|---|---|---|---|---|
| | | | | Setting wire | | | | | | | |
| Test No. | Shielding gas | Setting current Icc (A) | Setting voltage (V) | feeding speed (m/min) | Extension (mm) | Wire diameter d (mm) | Output voltage control Control condition | Control ON/OFF | Feeding speed control Control condition | Control ON/OFF | Gas ratio control Control condition |
| 46 | 100% $CO_2$ | 300 | 35 | 13.2 | 22 | 1.2 | 5% | ON | 100% (13.2 m/min) | OFF | 100% $CO_2$ |
| 47 | 100% $CO_2$ | 300 | 35 | 13.2 | 22 | 1.2 | 5% | ON | 100% (13.2 m/min) | OFF | 100% $CO_2$ |
| 48 | 100% $CO_2$ | 300 | 35 | 13.2 | 22 | 1.2 | 5% | ON | 100% (13.2 m/min) | OFF | 100% $CO_2$ |
| 49 | 100% $CO_2$ | 300 | 35 | 13.2 | 22 | 1.2 | 5% | ON | 100% (13.2 m/min) | OFF | 100% $CO_2$ |
| 50 | 100% $CO_2$ | 300 | 35 | 6.8 | 22 | 1.6 | 5% | ON | 100% (13.2 m/min) | OFF | 100% $CO_2$ |
| 51 | 100% $CO_2$ | 300 | 35 | 16.8 | 22 | 1 | 5% | ON | 100% (13.2 m/min) | OFF | 100% $CO_2$ |
| 52 | 100% $CO_2$ | 300 | 35 | 6.8 | 22 | 1.6 | 5% | ON | 100% (13.2 m/min) | OFF | 100% $CO_2$ |
| 53 | 100% $CO_2$ | 300 | 35 | 16.8 | 22 | 1 | 5% | ON | 100% (13.2 m/min) | OFF | 100% $CO_2$ |
| 54 | 100% $CO_2$ | 320 | 35 | 13.2 | 22 | 1.2 | 5% | ON | 100% (13.2 m/min) | OFF | 100% $CO_2$ |
| 55 | 100% $CO_2$ | 320 | 35 | 13.2 | 22 | 1.2 | 5% | ON | 100% (13.2 m/min) | OFF | 100% $CO_2$ |
| 56 | 100% $CO_2$ | 320 | 35 | 13.2 | 22 | 1.2 | 5% | ON | 100% (13.2 m/min) | OFF | 100% $CO_2$ |
| 57 | 100% $CO_2$ | 320 | 35 | 13.2 | 22 | 1.2 | 5% | ON | 100% (13.2 m/min) | OFF | 100% $CO_2$ |
| 58 | 100% $CO_2$ | 320 | 35 | 13.2 | 22 | 1.2 | 5% | ON | 100% (13.2 m/min) | OFF | 100% $CO_2$ |
| 59 | 100% $CO_2$ | 320 | 35 | 13.2 | 22 | 1.2 | 5% | ON | 100% (13.2 m/min) | OFF | 100% $CO_2$ |
| 50 | 100% $CO_2$ | 320 | 35 | 13.2 | 22 | 1.2 | 5% | ON | 100% (13.2 m/min) | OFF | 100% $CO_2$ |
| 61 | 100% $CO_2$ | 320 | 35 | 13.2 | 22 | 1.2 | 5% | ON | 100% (13.2 m/min) | OFF | 100% $CO_2$ |

TABLE 3-continued

| | | | | | | | | | | | |
|---|---|---|---|---|---|---|---|---|---|---|---|
| 62 | 100% CO₂ | 320 | 35 | 13.2 | 22 | 1.2 | 5% | ON | 100% (13.2 m/min) | OFF | 100% CO₂ |
| 63 | 100% CO₂ | 320 | 35 | 13.2 | 22 | 1.2 | 5% | ON | 100% (13.2 m/min) | OFF | 100% CO₂ |
| 64 | 100% CO₂ | 320 | 35 | 13.2 | 22 | 1.2 | 5% | ON | 100% (13.2 m/mm) | OFF | 100% CO₂ |
| 65 | 100% CO₂ | 320 | 35 | 13.2 | 22 | 1.2 | 5% | ON | 100% (13.2 m/min) | OFF | 100% CO₂ |
| 66 | 100% CO₂ | 320 | 35 | 13.2 | 22 | 1.2 | 5% | ON | 100% (13.2 m/min) | OFF | 100% CO₂ |
| 67 | 100% CO₂ | 320 | 35 | 13.2 | 22 | 1.2 | 5% | ON | 100% (13.2 m/min) | OFF | 100% CO₂ |
| 68 | 100% CO₂ | 320 | 35 | 13.2 | 22 | 1.2 | 5% | ON | 100% (13.2 m/min) | OFF | 100% CO₂ |
| 69 | 100% CO₂ | 300 | 35 | 13.2 | 22 | 1.2 | 5% | ON | 100% (13.2 m/min) | OFF | 100% CO₂ |
| 70 | 100% CO₂ | 300 | 35 | 13.2 | 22 | 1.2 | 5% | ON | 100% (13.2 m/min) | OFF | 100% CO₂ |
| 71 | 100% CO₂ | 300 | 35 | 13.2 | 22 | 1.2 | 5% | ON | 100% (13.2 m/min) | OFF | 100% CO₂ |
| 72 | 100% CO₂ | 300 | 35 | 13.2 | 22 | 1.2 | 5% | ON | 100% (13.2 m/min) | OFF | 100% CO₂ |
| 73 | 100% CO₂ | 300 | 35 | 13.2 | 22 | 1.2 | 10% | ON | 100% (13.2 m/min) | OFF | 100% CO₂ |
| 74 | 100% CO₂ | 300 | 35 | 13.2 | 22 | 1.2 | 10% | ON | 100% (13.2 m/min) | OFF | 100% CO₂ |
| 75 | 100% CO₂ | 250 | 28 | 11.2 | 22 | 1.2 | 5% | ON | 100% (11.2 m/min) | OFF | 100% CO₂ |
| 76 | 100% CO₂ | 280 | 32 | 12.8 | 22 | 1.2 | 5% | ON | 100% (12.8 m/min) | OFF | 100% CO₂ |
| 77 | 100% CO₂ | 380 | 40 | 16.2 | 22 | 1.2 | 5% | ON | 70% (11.3 m/min) | OFF | 100% CO₂ |
| 78 | 100% CO₂ | 400 | 44 | 19.2 | 22 | 1.2 | 5% | ON | 70% (11.3 m/min) | OFF | 100% CO₂ |

| | | Separation control period | | | | | |
|---|---|---|---|---|---|---|---|
| | | Current decreasing section | | Current maintaining section | | | Current increasing section |
| Test No. | Short-circuit prevention control Gas ratio control Control ON/OFF | Slope of welding current (A/ms) | Separation maintaining time Th1 (ms) | Separation maintaining current Ih1 (A) | Expression (1) | Expression (2) | Slope of welding current (A/ms) |
| 46 | OFF | −100 | 5 | 150 | 4.4 | 170.5 | 200 |
| 47 | OFF | −100 | 5 | 150 | 4.4 | 170.5 | 200 |
| 48 | OFF | −100 | 5 | 150 | 4.4 | 170.5 | 200 |
| 49 | OFF | −100 | 5 | 150 | 4.4 | 170.5 | 200 |
| 50 | OFF | −100 | 5 | 150 | 1.7 | 330.9 | 200 |
| 51 | OFF | −100 | 5 | 150 | 6.7 | 133.9 | 200 |
| 52 | OFF | −100 | 5 | 150 | 1.7 | 330.9 | 200 |
| 53 | OFF | −100 | 5 | 150 | 6.7 | 133.9 | 200 |
| 54 | OFF | −100 | 5 | 150 | 4.4 | 170.5 | 200 |
| 55 | OFF | −100 | 5 | 150 | 4.4 | 170.5 | 200 |
| 56 | OFF | −100 | 5 | 150 | 4.4 | 170.5 | 200 |
| 57 | OFF | −100 | 5 | 150 | 4.4 | 170.5 | 200 |
| 58 | OFF | −100 | 5 | 150 | 4.4 | 170.5 | 200 |
| 59 | OFF | −100 | 5 | 150 | 4.4 | 170.5 | 200 |
| 50 | OFF | −100 | 5 | 150 | 4.4 | 170.5 | 200 |
| 61 | OFF | −100 | 5 | 150 | 4.4 | 170.5 | 200 |
| 62 | OFF | −100 | 5 | 150 | 4.4 | 170.5 | 200 |
| 63 | OFF | 100 | 5 | 150 | 4.4 | 170.5 | 200 |
| 64 | OFF | −100 | 5 | 150 | 4.4 | 170.5 | 200 |
| 65 | OFF | −100 | 5 | 150 | 4.4 | 170.5 | 200 |
| 66 | OFF | −100 | 5 | 150 | 4.4 | 170.5 | 200 |
| 67 | OFF | −100 | 5 | 150 | 4.4 | 170.5 | 200 |
| 68 | OFF | −100 | 5 | 150 | 4.4 | 170.5 | 200 |
| 69 | OFF | −100 | 5 | 150 | 4.4 | 170.5 | 200 |
| 70 | OFF | −100 | 5 | 150 | 4.4 | 170.5 | 200 |
| 71 | OFF | −100 | 5 | 150 | 4.4 | 170.5 | 200 |
| 72 | OFF | −100 | 5 | 150 | 4.4 | 170.5 | 200 |
| 73 | OFF | −100 | 12 | 150 | 10.6 | 170.5 | 200 |
| 74 | OFF | −100 | 12 | 150 | 10.6 | 170.5 | 200 |
| 75 | OFF | −100 | 6 | 120 | 4.5 | 160.7 | 200 |
| 76 | OFF | −100 | 5 | 150 | 4.3 | 175.8 | 200 |
| 77 | OFF | −100 | 3 | 240 | 3.2 | 222.2 | 200 |
| 78 | OFF | −100 | 2 | 300 | 2.6 | 234.4 | 200 |

TABLE 4

| Test No. | Initial conditions of welding | | | Welding wire | | | Short-circuit prevention control | | | | |
|---|---|---|---|---|---|---|---|---|---|---|---|
| | Shielding gas | Setting current Icc (A) | Setting voltage (V) | Setting wire feeding speed (m/min) | Extension (mm) | Wire diameter d (mm) | Output voltage control | | Feeding speed control | | Gas ratio control |
| | | | | | | | Control condition | Control ON/OFF | Control condition | Control ON/OFF | Control condition |
| 79 | 100% $CO_2$ | 300 | 35 | 13.2 | 22 | 1.2 | 11% | ON | 100% (13.2 m/min) | OFF | 100% $CO_2$ |
| 80 | 100% $CO_2$ | 300 | 35 | 13.2 | 22 | 1.2 | −11% | ON | 100% (13.2 m/min) | OFF | 100% $CO_2$ |
| 81 | 100% $CO_2$ | 300 | 35 | 13.2 | 22 | 1.2 | — | OFF | 100% (13.2 m/min) | OFF | 40% Ar +60% $CO_2$ |
| 82 | 100% $CO_2$ | 300 | 35 | 13.2 | 22 | 1.2 | — | OFF | 100% (13.2 m/min) | OFF | 100% $CO_2$ |
| 83 | 100% $CO_2$ | 300 | 35 | 13.2 | 22 | 1.2 | — | OFF | 30% (3.9 m/min) | ON | 100% $CO_2$ |
| 84 | 100% $CO_2$ | 300 | 35 | 13.2 | 22 | 1.2 | — | OFF | 97% (12.8 m/min) | ON | 100% $CO_2$ |

| Test No. | Short-circuit prevention control Gas ratio control Control ON/OFF | Separation control period | | | | | |
|---|---|---|---|---|---|---|---|
| | | Current decreasing section | Current maintaining section | | | | Current increasing section |
| | | Slope of welding current (A/ms) | Separation maintaining time Th1 (ms) | Separation maintaining current Ih1 (A) | Expression (1) | Expression (2) | Slope of welding current (A/ms) |
| 79 | OFF | −100 | 5 | 150 | 4.4 | 170.5 | 200 |
| 80 | OFF | −100 | 5 | 150 | 4.4 | 170.5 | 200 |
| 81 | ON | −100 | 5 | 150 | 4.4 | 170.5 | 200 |
| 82 | OFF | −100 | 5 | 150 | 4.4 | 170.5 | 200 |
| 83 | OFF | −100 | 5 | 150 | 4.4 | 170.5 | 200 |
| 84 | OFF | −100 | 5 | 150 | 4.4 | 170.5 | 200 |

Further, conditions of the forced separation control, the forced separation control period, the forced separation arc period, and the separation detection means of the molten droplet are listed in Tables 5 to 8.

(Forced Molten Droplet Separation Control)
Monitoring time Tarc (ms)

$(d/1.2) \times (350/Icc) \times Tarc$  Value represented by Expression (3)

Whether to apply the control (ON/OFF of the forced separation control period)
(Forced Separation Control Period)
Forced current decreasing section
Slope of welding current (A/ms)
Forced current maintaining section
Forced separation maintaining time Th2 (ms)
Forced separation maintaining current Ih2 (A)
Forced current increasing section
Slope of welding current (A/ms)
(Forced Separation Arc Period)
Forced arc maintaining time Th3 (ms)
Forced arc maintaining current Ih3 (A)
Ratio of forced arc maintaining current Ih3 to setting current Icc (Ih3/Icc)
(Separation Detection Means)
Separation detection means in normal arc period
Separation detection means in forced separation arc period <Evaluation Methods>
(Bead Appearance)

The bead appearance was evaluated by measuring a difference between a maximum value and a minimum value of a wave at a bead edge. Determination was made such that the case where a difference (absolute value) between the maximum value and the minimum value was 2 mm or more was evaluated as "D" (poor), the case where the difference was 1 mm or more and less than 2 mm was evaluated as "B" (good), and the case where the difference was less than 1 mm was evaluated as "A" (excellent).

(Amount of Generated Spatter)

The bead appearance after the welding was photographed, the bead appearance photograph was taken into a computer and was subjected to binarization processing using image analysis software, thereby distinguishing spatter generated on the bead surface and a region where no spatter was generated. Then, the number of spatter inside a region of a welding length of 100 mm×a width of 75 mm starting from the position of 50 mm from an arc start was measured.

Determination was made such that the case where the number of spatter was less than 40% of the number of spatter in Test No. 82 (comparative example) in which the short circuit prevention control in the present invention was not performed was evaluated as "A" (excellent), the case where the number of spatter was 40% or more and less than 50% thereof was evaluated as "B" (good), the case where the number of spatter was 50% or more and less than 70% thereof was evaluated as "C" (available), and the case where the number of spatter 70% or more thereof was evaluated as "D" (poor).

The evaluation results of the bead appearance and the amount of generated spatter are shown in Tables 5 to 8.

TABLE 5

| Test No. | Forced separation control of molten part | | | Forced separation control period | | | Forced current increasing section Slope of welding current (A/ms) |
|---|---|---|---|---|---|---|---|
| | Monitoring time Tarc (ms) | Expression (3) | Forced separation control period ON/OFF | Forced current decreasing section Slope of welding current (A/ms) | Forced current maintaining section | | |
| | | | | | Forced separation maintaining time Th2 (ms) | Forced separation maintaining current Ih2 (A) | |
| 1 | 20 | 23.3 | ON | −200 | 3 | 150 | 200 |
| 2 | 20 | 21.9 | ON | −200 | 3 | 150 | 200 |
| 3 | 20 | 21.9 | ON | −200 | 3 | 150 | 200 |
| 4 | 20 | 25.0 | ON | −200 | 3 | 150 | 200 |
| 5 | 20 | 27.2 | ON | −200 | 3 | 150 | 200 |
| 6 | 20 | 25.5 | ON | −200 | 3 | 150 | 200 |
| 7 | 20 | 29.2 | ON | −200 | 3 | 150 | 200 |
| 8 | 20 | 25.0 | ON | −200 | 3 | 150 | 200 |
| 9 | 20 | 25.0 | ON | −200 | 3 | 150 | 200 |
| 10 | 20 | 25.0 | ON | −200 | 3 | 150 | 200 |
| 11 | 20 | 25.0 | ON | −200 | 3 | 150 | 200 |
| 12 | 20 | 25.0 | ON | −200 | 3 | 150 | 200 |
| 13 | 20 | 25.0 | ON | −200 | 3 | 150 | 200 |
| 14 | 20 | 25.0 | ON | −200 | 3 | 150 | 200 |
| 15 | 20 | 25.0 | ON | −200 | 3 | 150 | 200 |
| 16 | 20 | 25.0 | ON | −200 | 3 | 150 | 200 |
| 17 | 20 | 25.0 | ON | −200 | 3 | 150 | 200 |
| 18 | 20 | 25.0 | ON | −200 | 3 | 150 | 200 |
| 19 | 20 | 25.0 | ON | −200 | 3 | 150 | 200 |
| 20 | 20 | 25.0 | ON | −200 | 3 | 150 | 200 |
| 21 | 20 | 25.0 | ON | −200 | 3 | 150 | 200 |
| 22 | 20 | 25.0 | ON | −200 | 3 | 150 | 200 |
| 23 | 20 | 25.0 | ON | −200 | 3 | 150 | 200 |

| Test No. | Forced separation arc period | | | Separation detection means | | Evaluation | |
|---|---|---|---|---|---|---|---|
| | Forced arc maintaining time Th3 (ms) | Forced arc maintaining current Ih3 (A) | Ih3/Icc | Normal arc period | Forced separation arc period | Bead appearance | Amount of generated spatter |
| 1 | 6 | 500 | 1.67 | Arc resistance | Arc voltage | A | A |
| 2 | 6 | 500 | 1.56 | Arc resistance | Arc voltage | A | A |
| 3 | 6 | 500 | 1.56 | Arc resistance | Arc voltage | A | A |
| 4 | 6 | 500 | 1.79 | Arc resistance | Arc voltage | A | A |
| 5 | 6 | 500 | 1.67 | Arc resistance | Arc voltage | A | A |
| 6 | 6 | 500 | 1.56 | Arc resistance | Arc voltage | A | A |
| 7 | 6 | 500 | 1.79 | Arc resistance | Arc voltage | A | A |
| 8 | 6 | 500 | 1.79 | Arc resistance | Arc voltage | A | A |
| 9 | 6 | 500 | 1.79 | Arc resistance | Arc voltage | B | B |
| 10 | 6 | 500 | 1.79 | Arc resistance | Arc voltage | B | B |
| 11 | 6 | 500 | 1.79 | Arc resistance | Arc voltage | B | B |
| 12 | 6 | 500 | 1.79 | Arc resistance | Arc voltage | B | B |
| 13 | 6 | 500 | 1.79 | Arc resistance | Arc voltage | A | A |
| 14 | 6 | 500 | 1.79 | Arc resistance | Arc voltage | B | B |
| 15 | 6 | 500 | 1.79 | Arc resistance | Arc voltage | A | A |
| 16 | 6 | 500 | 1.79 | Arc resistance | Arc voltage | B | B |
| 17 | 6 | 500 | 1.79 | Arc resistance | Arc voltage | A | A |
| 18 | 6 | 500 | 1.79 | Arc resistance | Arc voltage | A | A |
| 19 | 6 | 500 | 1.79 | Arc resistance | Arc voltage | B | B |
| 20 | 6 | 500 | 1.79 | Arc resistance | Arc voltage | A | A |
| 21 | 6 | 500 | 1.79 | Arc resistance | Arc voltage | A | A |
| 22 | 6 | 500 | 1.79 | Arc resistance | Arc voltage | A | A |
| 23 | 6 | 500 | 1.79 | Arc resistance | Arc voltage | A | A |

TABLE 6

| Test No. | Forced separation control of molten part | | | Forced separation control period | | | Forced current increasing section Slope of welding current (A/ms) |
|---|---|---|---|---|---|---|---|
| | Monitoring time Tarc (ms) | Expression (3) | Forced separation control period ON/OFF | Forced current decreasing section Slope of welding current (A/ms) | Forced current maintaining section | | |
| | | | | | Forced separation maintaining time Th2 (ms) | Forced separation maintaining current Ih2 (A) | |
| 24 | 20 | 23.3 | ON | −200 | 3 | 150 | 200 |
| 25 | 20 | 23.3 | ON | −200 | 3 | 150 | 200 |
| 26 | 20 | 23.3 | ON | −200 | 3 | 150 | 200 |
| 27 | 20 | 23.3 | ON | −200 | 3 | 150 | 200 |
| 28 | 20 | 23.3 | ON | −200 | 3 | 150 | 200 |
| 29 | 20 | 23.3 | ON | −200 | 3 | 150 | 200 |

TABLE 6-continued

| | | | | | | | |
|---|---|---|---|---|---|---|---|
| 30 | 20 | 23.3 | ON | −200 | 3 | 150 | 200 |
| 31 | 20 | 23.3 | ON | −200 | 3 | 150 | 200 |
| 32 | 20 | 19.4 | ON | −200 | 3 | 150 | 200 |
| 33 | 20 | 31.1 | ON | −200 | 3 | 150 | 200 |
| 34 | 20 | 19.4 | ON | −200 | 3 | 150 | 200 |
| 35 | 20 | 51.9 | ON | −200 | 3 | 150 | 200 |
| 36 | 20 | 23.3 | ON | −200 | 3 | 150 | 200 |
| 37 | 20 | 23.3 | ON | −200 | 3 | 150 | 200 |
| 38 | 20 | 23.3 | ON | −200 | 3 | 150 | 200 |
| 39 | 20 | 23.3 | ON | −200 | 3 | 150 | 200 |
| 40 | 20 | 23.3 | ON | −200 | 3 | 150 | 200 |
| 41 | 20 | 23.3 | ON | −200 | 3 | 150 | 200 |
| 42 | 20 | 23.3 | ON | −200 | 3 | 150 | 200 |
| 43 | 20 | 23.3 | ON | −200 | 3 | 150 | 200 |
| 44 | 20 | 23.3 | ON | −200 | 3 | 150 | 200 |
| 45 | 20 | 23.3 | ON | −200 | 3 | 150 | 200 |

| | Forced separation arc period | | | Separation detection means | | Evaluation | |
|---|---|---|---|---|---|---|---|
| Test No. | Forced arc maintaining time Th3 (ms) | Forced arc maintaining current Ih3 (A) | Ih3/Icc | Normal arc period | Forced separation arc period | Bead appearance | Amount of generated spatter |
| 24 | 6 | 500 | 1.67 | Arc resistance | Arc voltage | A | A |
| 25 | 6 | 500 | 1.67 | Arc resistance | Arc voltage | A | A |
| 26 | 6 | 500 | 1.67 | Arc resistance | Arc voltage | B | B |
| 27 | 6 | 500 | 1.67 | Arc resistance | Arc voltage | B | B |
| 28 | 6 | 500 | 1.67 | Arc resistance | Arc voltage | A | A |
| 29 | 6 | 500 | 1.67 | Arc resistance | Arc voltage | A | A |
| 30 | 6 | 500 | 1.67 | Arc resistance | Arc voltage | B | B |
| 31 | 6 | 500 | 1.67 | Arc resistance | Arc voltage | B | B |
| 32 | 6 | 500 | 1.67 | Arc resistance | Arc voltage | A | A |
| 33 | 6 | 500 | 1.67 | Arc resistance | Arc voltage | A | A |
| 34 | 6 | 500 | 1.67 | Arc resistance | Arc voltage | B | B |
| 35 | 6 | 500 | 2.78 | Arc resistance | Arc voltage | B | B |
| 36 | 6 | 500 | 1.67 | Arc resistance | Arc voltage | A | A |
| 37 | 6 | 500 | 1.67 | Arc resistance | Arc voltage | A | A |
| 38 | 6 | 500 | 1.67 | Arc resistance | Arc voltage | A | A |
| 39 | 6 | 500 | 1.67 | Arc resistance | Arc voltage | A | A |
| 40 | 6 | 500 | 1.67 | Arc resistance | Arc voltage | B | B |
| 41 | 6 | 500 | 1.67 | Arc resistance | Arc voltage | B | B |
| 42 | 6 | 500 | 1.67 | Arc resistance | Arc voltage | A | A |
| 43 | 6 | 500 | 1.67 | Arc resistance | Arc voltage | A | A |
| 44 | 6 | 500 | 1.67 | Arc resistance | Arc voltage | B | B |
| 45 | 6 | 500 | 1.67 | Arc resistance | Arc voltage | B | B |

TABLE 7

| | Forced separation control of molten part | | | Forced separation control period | | | |
|---|---|---|---|---|---|---|---|
| | | | | Forced current decreasing section | Forced current maintaining section | | Forced current increasing section |
| Test No. | Monitoring time Tarc (ms) | Expression (3) | Forced separation control period ON/OFF | Slope of welding current (A/ms) | Forced separation maintaining time Th2 (ms) | Forced separation maintaining current Ih2 (A) | Slope of welding current (A/ms) |
| 46 | 60 | 70.0 | ON | −200 | 3 | 150 | 200 |
| 47 | 10 | 11.7 | ON | −200 | 3 | 150 | 200 |
| 48 | 65 | 75.8 | ON | −200 | 3 | 150 | 200 |
| 49 | 8 | 9.3 | ON | −200 | 3 | 150 | 200 |
| 50 | 50 | 77.8 | ON | −200 | 3 | 150 | 200 |
| 51 | 11 | 10.7 | ON | −200 | 3 | 150 | 200 |
| 52 | 55 | 85.6 | ON | −200 | 3 | 150 | 200 |
| 53 | 10 | 9.7 | ON | −200 | 3 | 150 | 200 |
| 54 | 20 | 21.9 | ON | −100 | 3 | 150 | 200 |
| 55 | 20 | 21.9 | ON | −90 | 3 | 150 | 200 |
| 56 | 20 | 21.9 | ON | −200 | 5 | 150 | 200 |
| 57 | 20 | 21.9 | ON | −200 | 1 | 150 | 200 |
| 58 | 20 | 21.9 | ON | −200 | 6 | 150 | 200 |
| 59 | 20 | 21.9 | ON | −200 | 0.5 | 150 | 200 |
| 60 | 20 | 21.9 | ON | −200 | 3 | 150 | 300 |
| 61 | 20 | 21.9 | ON | −200 | 3 | 150 | 10 |
| 62 | 20 | 21.9 | ON | −200 | 3 | 150 | 310 |
| 63 | 20 | 21.9 | ON | −200 | 3 | 150 | 5 |
| 64 | 20 | 21.9 | ON | −200 | 5 | 150 | 200 |
| 65 | 20 | 21.9 | ON | −200 | 5 | 150 | 200 |
| 66 | 20 | 21.9 | ON | −200 | 5 | 150 | 200 |
| 67 | 20 | 21.9 | ON | −200 | 5 | 150 | 200 |

TABLE 7-continued

| | | | | | | | |
|---|---|---|---|---|---|---|---|
| 68 | 20 | 21.9 | ON | −200 | 5 | 150 | 200 |
| 69 | 20 | 23.3 | ON | −200 | 5 | 150 | 200 |
| 70 | 20 | 23.3 | ON | −200 | 5 | 150 | 200 |
| 71 | 20 | 23.3 | ON | −200 | 5 | 150 | 200 |
| 72 | 20 | 23.3 | OFF | — | — | — | — |
| 73 | 20 | 23.3 | ON | −200 | 3 | 150 | 200 |
| 74 | 20 | 23.3 | ON | −200 | 3 | 150 | 200 |
| 75 | 30 | 42.0 | ON | −200 | 3 | 150 | 200 |
| 76 | 25 | 31.3 | ON | −200 | 3 | 150 | 200 |
| 77 | 15 | 13.8 | ON | −200 | 3 | 150 | 200 |
| 78 | 10 | 8.8 | ON | −200 | 3 | 150 | 200 |

| | Forced separation arc period | | | Separation detection means | | Evaluation | |
|---|---|---|---|---|---|---|---|
| Test No. | Forced arc maintaining time Th3 (ms) | Forced arc maintaining current Ih3 (A) | Ih3/Icc | Normal arc period | Forced separation arc period | Bead appearance | Amount of generated spatter |
| 46 | 6 | 500 | 1.67 | Arc resistance | Arc voltage | A | A |
| 47 | 6 | 500 | 1.67 | Arc resistance | Arc voltage | A | A |
| 48 | 6 | 500 | 1.67 | Arc resistance | Arc voltage | B | B |
| 49 | 6 | 500 | 1.67 | Arc resistance | Arc voltage | B | B |
| 50 | 6 | 500 | 1.67 | Arc resistance | Arc voltage | A | A |
| 51 | 6 | 500 | 1.67 | Arc resistance | Arc voltage | A | A |
| 52 | 6 | 500 | 1.67 | Arc resistance | Arc voltage | B | B |
| 53 | 6 | 500 | 1.67 | Arc resistance | Arc voltage | B | B |
| 54 | 6 | 500 | 1.56 | Arc resistance | Arc voltage | A | A |
| 55 | 6 | 500 | 1.56 | Arc resistance | Arc voltage | B | B |
| 56 | 6 | 500 | 1.56 | Arc resistance | Arc voltage | A | A |
| 57 | 6 | 500 | 1.56 | Arc resistance | Arc voltage | A | A |
| 58 | 6 | 500 | 1.56 | Arc resistance | Arc voltage | B | B |
| 59 | 6 | 500 | 1.56 | Arc resistance | Arc voltage | B | B |
| 60 | 6 | 500 | 1.56 | Arc resistance | Arc voltage | A | A |
| 61 | 6 | 500 | 1.56 | Arc resistance | Arc voltage | A | A |
| 62 | 6 | 500 | 1.56 | Arc resistance | Arc voltage | B | B |
| 63 | 6 | 500 | 1.56 | Arc resistance | Arc voltage | B | B |
| 64 | 10 | 500 | 1.56 | Arc resistance | Arc voltage | A | A |
| 65 | 3 | 500 | 1.56 | Arc resistance | Arc voltage | A | A |
| 66 | 11 | 500 | 1.56 | Arc resistance | Arc voltage | B | B |
| 67 | 2 | 500 | 1.55 | Arc resistance | Arc voltage | B | B |
| 68 | 6 | 750 | 2.34 | Arc resistance | Arc voltage | A | A |
| 69 | 6 | 360 | 1.20 | Arc resistance | Arc voltage | A | A |
| 70 | 6 | 760 | 2.53 | Arc resistance | Arc voltage | B | B |
| 71 | 6 | 350 | 1.17 | Arc resistance | Arc voltage | B | B |
| 72 | — | — | — | Arc resistance | Arc voltage | B | B |
| 73 | 6 | 500 | 1.67 | Arc voltage | Arc voltage | A | B |
| 74 | 6 | 500 | 1.67 | Arc resistance | Arc resistance | A | B |
| 75 | 6 | 500 | 2.00 | Arc resistance | Arc voltage | B | C |
| 76 | 6 | 500 | 1.79 | Arc resistance | Arc voltage | B | B |
| 77 | 6 | 500 | 1.32 | Arc resistance | Arc voltage | A | A |
| 78 | 6 | 500 | 1.25 | Arc resistance | Arc voltage | B | C |

TABLE 8

| | Forced separation control of molten part | | Forced separation control period | | | |
|---|---|---|---|---|---|---|
| | | | | Forced current | Forced current maintaining section | Forced current |
| Test No. | Monitoring time Tarc (ms) | Expression (3) | Forced separation control period ON/OFF | decreasing section Slope of welding current (A/ms) | Forced separation maintaining time Th2 (ms) | Forced separation maintaining current Ih2 (A) | increasing section Slope of welding current (A/ms) |
| 79 | 20 | 23.3 | ON | −200 | 3 | 150 | 200 |
| 80 | 20 | 23.3 | ON | −200 | 3 | 150 | 200 |
| 81 | 20 | 23.3 | ON | −200 | 3 | 150 | 200 |
| 82 | 20 | 23.3 | ON | −200 | 3 | 150 | 200 |
| 83 | 20 | 23.3 | ON | −200 | 3 | 150 | 200 |
| 84 | 20 | 23.3 | ON | −200 | 3 | 150 | 200 |

| | Forced separation arc period | | | Separation detection means | | Evaluation | |
|---|---|---|---|---|---|---|---|
| Test No. | Forced arc maintaining time Th3 (ms) | Forced arc maintaining current Ih3 (A) | Ih3/Icc | Normal arc period | Forced separation arc period | Bead appearance | Amount of generated spatter |
| 79 | 6 | 500 | 1.67 | Arc resistance | Arc voltage | D | D |
| 80 | 6 | 500 | 1.67 | Arc resistance | Arc voltage | D | D |
| 81 | 6 | 500 | 1.67 | Arc resistance | Arc voltage | D | D |

TABLE 8-continued

| 82 | 6 | 500 | 1.67 | Arc resistance | Arc voltage | D | D |
| 83 | 6 | 500 | 1.67 | Arc resistance | Arc voltage | D | D |
| 84 | 6 | 500 | 1.67 | Arc resistance | Arc voltage | D | D |

Test Nos. 1 to 78 in Tables 1 to 3 and Tables 5 to 7 were examples that satisfied requirements of the present invention, and excellent results were obtained for at least one of the bead appearance and the amount of generated spatter.

Also, further excellent results were obtained for at least one of the bead appearance and the amount of generated spatter in the examples that satisfied the requirements of the aforementioned preferred embodiments.

On the other hand, Test Nos. 79 to 84 in Table 4 and Table 8 were comparative examples that did not satisfy the requirements of the present invention and showed the following failures.

In Test No. 79, since the arc voltage exceeded +10% of the setting voltage in regard to the output voltage control, both the bead appearance and the amount of generated spatter were evaluated as "D" (poor).

In Test No. 80, since the arc voltage was less than −10% of the setting voltage in regard to the output voltage control, both the bead appearance and the amount of generated spatter were evaluated as "D" (poor).

In Test No. 81, since the increased Ar ratio in the shielding gas was less than 50% by volume in regard to the gas ratio control, both the bead appearance and the amount of generated spatter were evaluated as "D" (poor).

In Test No. 82, since any short-circuit prevention control out of the output voltage control, the feeding speed control, and the gas ratio control was not performed, both the bead appearance and the amount of generated spatter were evaluated as "D" (poor).

In Test No. 83, since the deceleration rate of the wire feeding speed Fs with respect to the setting wire feeding speed was less than 40% in regard to the feeding speed control, both the bead appearance and the amount of generated spatter were evaluated as "D" (poor).

In Test No. 84, since the deceleration rate of the wire feeding speed Fs with respect to the setting wire feeding speed exceeded 95% in regard to the feeding speed control, both the bead appearance and the amount of generated spatter were evaluated as "D" (poor).

Although various embodiments have been described above with reference to the drawings, it is needless to say that the present invention is not limited to such examples. It is obvious for a skilled in the art that various modification examples or amendment examples can be achieved within the scope described in the claims, and it should be understood that the modification examples and the amendment examples are also within the technical scope of the present invention as a matter of course. Further, the components in the aforementioned embodiments may arbitrarily be combined without departing from the gist of the present invention.

The present application is based on Japanese Patent Application No. 2018-062123 filed on Mar. 28, 2018, the content of which is incorporated herein by reference.

REFERENCE SIGNS LIST

1 Output control element
2 Transformer
3 Rectifying unit
4 Contact tip
5 Wire
6 Welding arc
7 Welded material
8 DC reactor
9 Welding current detector
10 Welding voltage detector
11 Welding voltage differentiator
12 Second-order differentiator
13 Second-order differential value setter
14 Comparator
15 Output controller
16 Arc resistance calculator
17 Arc resistance differentiator
18 Molten droplet separation detection unit
19 Waveform setter
20 Waveform generator
100 Welding robot
110 Welding torch
200 Robot controller
300 Welding power source
400 Feeding apparatus

The invention claimed is:

1. A method of gas-shielded arc welding controlling welding current using, as a shielding gas, carbon dioxide gas having a $CO_2$ content of 100% by volume or a mixed gas having a $CO_2$ content of 30% by volume or more with the balance being Ar, the method comprising:
providing a normal arc period in which the welding current is maintained at a setting current $I_{cc}$ set in advance;
detecting a separation timing of a molten droplet at a welding wire tip melted by an arc; and
providing a separation control period after the separation timing of the molten droplet is detected in the normal arc period, the separation control period including a current decreasing section in which the welding current is decreased, a current maintaining section in which the welding current is maintained at a constant separation maintaining current $I_{h1}$ after the current decreasing section, and a current increasing section in which the welding current is increased after the current maintaining section,
wherein the separation control period, for preventing a short circuit, comprises
controlling an output voltage by maintaining the arc voltage during welding within ±10% with respect to a setting voltage.

2. The method of claim 1, wherein:
in a case of performing the control (a), the arc voltage is maintained within ±5% with respect to the setting voltage.

3. The method of claim 1, wherein a slope of the welding current in the current decreasing section, the slope being an amount of change in the welding current per unit time, is in a range of from −200 A/ms to −50 A/ms,
wherein a separation maintaining time $T_{h1}$ of the welding current in the current maintaining section is in a range of from 2 ms to 8 ms, wherein a slope of the welding current in the current increasing section is in a range of from 50 A/ms to 300 A/ms, and wherein the separation maintaining time $T_{h1}$ in ms, a wire diameter d in mm, and the wire feeding speed Fs in in/min in the current maintaining section satisfy the following relationship (1):

$$0.4 \leq (1.2/d) \times (Fs/15) \times T_{h1} \leq 10 \quad (1).$$

4. The method of claim 1, wherein the separation maintaining current $I_{h1}$ in A and the wire feeding speed Fs in m/min in the current maintaining section satisfy relationship (2):

$$50 \leq (15/Fs) \times I_{h1} \leq 280 \quad (2).$$

5. The method of claim 1, further comprising:

providing a forced separation control period for forcibly promoting separation of a molten droplet in a case where a separation cycle of the molten droplet, which is defined as a total period of the separation control period and the normal arc period, exceeds a monitoring time $T_{arc}$ set in advance, wherein the monitoring time $T_{arc}$ is in a range of from 10 ms to 60 ms, and wherein the monitoring time $T_{arc}$ in ms, the setting current $I_{cc}$ in A, and a wire diameter d in mm of the welding wire satisfy relationship (3):

$$10 \leq (d/1.2) \times (350/Icc) \times T_{arc} \leq 80 \quad (3).$$

6. The method of claim 5, wherein the forced separation control period includes a forced current decreasing section in which the welding current is decreased, a forced current maintaining section in which the welding current is maintained at a constant forced separation maintaining current $I_{h2}$ after the forced current decreasing section, and a forced current increasing section in which the welding current is increased after the forced current maintaining section, wherein a slope of the welding current in the forced current decreasing section is in a range of from −100 A/ms or less, wherein a forced separation maintaining time $T_{h2}$ of the welding current in the forced current maintaining section is in a range of from 1 ms to 5 ms, wherein a slope of the welding current in the forced current increasing section is in a range of from 10 A/ms to 300 A/ms, and wherein the method further:

comprises providing a forced separation arc period in which the welding current after the forced separation control period is maintained under a condition of a forced arc maintaining current $I_{h3}$ being in a range of from 1.20 to 2.50 times the setting current $I_{cc}$ and a forced arc maintaining time $T_{h3}$ in a range of from 3 ins to 10 ms.

7. The method of claim 5, wherein in a case where a separation timing of the molten droplet is detected in the forced separation control period, the control moves on to the current decreasing section in the separation control period.

8. The method of claim 6, wherein in a case where a separation timing of the molten droplet is detected in the forced separation arc period, the control moves on to the current decreasing section in the separation control period.

9. The method of claim 6, wherein a separation timing of the molten droplet in the forced separation control period or the forced separation arc period is detected using the arc voltage.

10. The method of claim 1, wherein the separation timing of the molten droplet in the normal arc period is detected using an arc resistance.

11. A control apparatus configured for gas-shielded arc welding in which a welding current is controlled using, as a shielding gas, carbon dioxide gas having $CO_2$ content of 100% by volume or a mixed gas having $CO_2$ content of 30% by volume or more with the balance being Ar, the control apparatus configured to perform:

providing a normal arc period in which the welding current is maintained at a setting current $I_{cc}$ set in advance;

detecting a separation timing of a molten droplet at a welding wire tip melted by an arc; and providing a separation control period after the separation timing of the molten droplet is detected in the normal arc period, the separation control period including a current decreasing section in which the welding current is decreased, a current maintaining section in which the welding current is maintained at a constant separation maintaining current $I_{h1}$ after the current decreasing section, and a current increasing section in which the welding current is increased after the current maintaining section, wherein the separation control period, for preventing a short circuit, comprises controlling an output voltage by maintaining the arc voltage during welding within ±10% with respect to the setting voltage.

12. The method of claim 2, wherein a slope of the welding current in the current decreasing section, the slope being an amount of change in the welding current per unit time, is in a range of from −200 A/ms to −50 A/ms, wherein a separation maintaining time $T_{h1}$ of the welding current in the current maintaining section is in a range of from 2 ins to 8 ins, wherein a slope of the welding current in the current increasing section is in a range of from 50 A/ms to 300 A/ms, and wherein the separation maintaining time $T_{h1}$ in ms, a wire diameter d in mm, and the wire feeding speed Fs ni m/min in the current maintaining section satisfy relationship (1):

$$0.4 \leq (1.2/d) \times (Fs/15) \times T_{h1} \leq 10 \quad (1).$$

13. The method of claim 2, wherein the separation maintaining current $I_{h1}$ in A and the wire feeding speed Fs in m/min in the current maintaining section satisfy relationship (2):

$$50 \leq (15/Fs) \times I_{h1} \leq 280 \quad (2).$$

14. The method of claim 2, further comprising:

providing a forced separation control period for forcibly promoting separation of a molten droplet in a case where a separation cycle of the molten droplet, which is defined as a total period of the separation control period and the normal arc period, exceeds a monitoring time $T_{arc}$ set in advance, wherein the monitoring time $T_{arc}$ is in a range of from 10 ins to 60 ms, and wherein the monitoring time $T_{arc}$ in ms, the setting current $I_{cc}$ in A, and a wire diameter d in mm of the welding wire satisfy relationship (3):

$$10 \leq (d/1.2) \times (350/I_{cc}) \times T_{arc} \leq 80 \quad (3).$$

15. The method of claim 14, wherein the forced separation control period comprises a forced current decreasing section in which the welding current is decreased, a forced current maintaining section in which the welding current is maintained at a constant forced separation maintaining current Ih2 after the forced current decreasing section, and a forced current increasing section in which the welding current is increased after the forced current maintaining section,
- wherein a slope of the welding current in the forced current decreasing section is in a range of from −100 A/ms or less,
- wherein a forced separation maintaining time $T_{h2}$ of the welding current in the forced current maintaining section is in a range of from 1 ms to 5 ms,
- wherein a slope of the welding current in the forced current increasing section is in a range of from 10 A/ms to 300 A/ms, and
- wherein the method further comprises:
- providing a forced separation arc period in which the welding current after the forced separation control period is maintained under a condition of a forced arc maintaining current $I_{h3}$ being in a range of from 1.20 to 2.50 times the setting current $I_{cc}$ and a forced arc maintaining time $T_{h3}$ in a range of from 3 ins to 10 ms.

16. The method of claim 14, wherein in a case where a separation timing of the molten droplet is detected in the forced separation control period, the control moves on to the current decreasing section in the separation control period.

17. The method of claim 15, wherein in a case where a separation timing of the molten droplet is detected in the forced separation arc period, the control moves on to the current decreasing section in the separation control period.

18. The method of claim 15, wherein a separation timing of the molten droplet in the forced separation control period or the forced separation arc period is detected using the arc voltage.

19. The method of claim 2, wherein the separation timing of the molten droplet in the normal arc period is detected using an arc resistance.

* * * * *